(12) United States Patent
Anand

(10) Patent No.: US 7,372,463 B2
(45) Date of Patent: May 13, 2008

(54) METHOD AND SYSTEM FOR INTELLIGENT SCALABLE ANIMATION WITH INTELLIGENT PARALLEL PROCESSING ENGINE AND INTELLIGENT ANIMATION ENGINE

(75) Inventor: Paul Vivek Anand, 22340 N. Summit Ridge Cir., Chatsworth, CA (US) 91311

(73) Assignee: Paul Vivek Anand, Reseda, CA (US)

( * ) Notice: Subject to any disclaimer, the term of this patent is extended or adjusted under 35 U.S.C. 154(b) by 129 days.

(21) Appl. No.: 10/880,549

(22) Filed: Jul. 1, 2004

(65) Prior Publication Data

US 2005/0225552 A1 Oct. 13, 2005

Related U.S. Application Data

(60) Provisional application No. 60/560,893, filed on Apr. 9, 2004.

(51) Int. Cl.
*G06T 13/00* (2006.01)
(52) U.S. Cl. ........................................ 345/473
(58) Field of Classification Search ............... 345/957, 345/959, 952
See application file for complete search history.

(56) References Cited

U.S. PATENT DOCUMENTS

| | | | | |
|---|---|---|---|---|
| 5,515,486 | A * | 5/1996 | Amro et al. ................. | 715/848 |
| 6,208,357 | B1 * | 3/2001 | Koga et al. .................. | 345/473 |
| 6,446,056 | B1 * | 9/2002 | Sadakuni ..................... | 706/14 |
| 2002/0015055 | A1 * | 2/2002 | Foran .......................... | 345/679 |

OTHER PUBLICATIONS

Regelous, International Application Publication No. WO 03/015034, Feb. 20, 2003.*
Helmut Lorek, Matthew White, "Parallel Bird Flocking Simulation," May 25, 1993, Edinburgh Parallel Computing Centre, Parallel Processing for Graphics and Scientific Visualization, retrieved from <URL:http://citeseer.ist.psu.edu/lorek93parallel.html>.*
George G. Robertson, Stuart K. Card, and Jock D. Mackinlay, "Information Visualization Using 3D Interactive Animation," Apr. 1993, Communications of the ACM, vol. 3, No. 4, p. 57-71.*
Xiaoyuan Tu and Demetri Terzopoulos, "Artificial Fishes: Physics, Locomotion, Perception, Behavior," Jul. 1994, Siggraph '94, Computer Graphics Proceedings, vol. 28, p. 43-50.*

(Continued)

*Primary Examiner*—Ulka Chauhan
*Assistant Examiner*—Jason M Repko
(74) *Attorney, Agent, or Firm*—McDermott Will & Emery LLP

(57) ABSTRACT

A method and a system for computer graphics animation is disclosed. The present invention provides a novel client-server architecture for scalable computer animation particularly adapted to computer animation. The animation tasks are identified as those that scale well and those that do not, and scalable animation tasks are sent to servers while non-scalable tasks are sent to the client. For computing animation tasks at the servers, the present invention provides a novel, intelligent parallel processing distribution engine that distributes the scalable animation tasks among several servers highly efficiently. Furthermore, the present invention provides intelligent animation engine at the scalable animation servers, incorporating intelligent animation algorithms, including AI methodologies such as neural net, genetic algorithm, and optical flow analysis. Scalable client-server animation incorporating AI methodologies is novel.

4 Claims, 24 Drawing Sheets

OTHER PUBLICATIONS

Soraia Raupp Musse, Fabien Garat, Daniel Thalmann, "Guiding and Interacting with Virtual Crowds in Real-time," Sep. 24, 1999, Computer Animation and Simulation '99: Proceedings of the Eurographics Workshop, p. 23-34.*

Soraia R. Musse, Christian Babski, Tolga Çapin and Daniel Thalmann, "Crowd Modeling in Collaborative Virtual Environments," Nov. 2, 1998, Proceedings of the ACM Symposium on Virtual Reality Software and Technology, p. 115-123.*

James J. Kuffner, "Autonomous Agents For Real-Time Animation," Dec. 1999, PhD. Thesis, Stanford University, p. 67-94.*

Tsai-Yen Li, Jian-Wen Lin, Yi-Lin Liu, and Chang-Ming Hsu, "Interactively Directing Virtual Crowds in a Virtual Environment," Oct. 25, 2000, Proceedings of the 10th International Conference on Artificial Reality and Telexistence.*

Thomas E. Portegys, Kevin M. Greenan, "Managing Flocking Objects with an Octree Spanning a Parallel Message-Passing Computer Cluster," Jun. 23, 2003, Proceedings of the International Conference on Parallel and Distributed Processing Techniques and Applications, vol. 2, p. 683-687.*

Wentong Cai, Percival Xavier, Stephen J. Turner and Bu-Sung Lee, "A Scalable Architecture for Supporting Interactive Games On The Internet," May 12, 2002, Proceedings of the Sixteenth Workshop on Parallel and Distributed Simulation, p. 60-67.*

David A. Ellsworth, "A New Algorithm for Interactive Graphics on Multicomputers," Jul. 1994, Computer Graphics and Applications, IEEE, vol. 14, Issue 4, p. 33-40.*

Kwan-Liu Ma, James S. Painter, Charles D. Hansen, Michael F. Krogh, "Parallel Volume Rendering using Binary-Swap Compositing," Jul. 1994, Computer Graphics and Applications, IEEE, vol. 14, No. 4, 59-68.*

* cited by examiner

METHOD AND SYSTEM FOR INTELLIGENT SCALABLE ANIMATION WITH INTELLIGENT PARALLEL PROCESSING ENGINE AND INTELLIGENT ANIMATION ENGINE

CROSS-REFERENCES AND RELATED APPLICATIONS

This application claims priority to U.S. Provisional Application No. 60/560,893, filed Apr. 9, 2004, and entitled SYSTEM AND METHOD FOR INTELLIGENT SCALABLE ANIMATION WITH INTELLIGENT PARALLEL PROCESSING ENGINE AND INTELLIGENT ANIMATION ENGINE", which is herein incorporated by reference in its entirety for all purposes.

BACKGROUND OF THE INVENTION

1. Field of the Invention

The present invention relates generally to computer graphics animation, and specifically to method and system for intelligent scalable animation with intelligent parallel processing engine and intelligent animation engine.

2. Description of the Related Art

Computer graphics animation is one of the most rapidly developing areas of computer technology. In the motion picture industry in particular, computer graphics animation technology, dubbed CGI (computer graphics imaging) by the industry, has had a profound impact on how movies are conceived and produced. One of the most recent application of graphics animation for motion picture production is crowd animation or simulation. Also known as digital extras, crowd simulation technology provides crowd-related visual effects by utilizing the computer graphics animation technology, eliminating the need to hire thousands of human extras to film large crowd scenes.

At present, crowd simulation solutions are provided by vendors such as Biographics Technologies or Softimage. The existing solutions, however, suffer from several significant shortcomings. One of the shortcomings, perhaps the most serious one, is that the existing crowd simulation solutions do not scale well. Existing products are self-contained, one-box solutions, where the animation software runs on a single computer system. Thus, in order to increase the performance of the system, the users must increase the performance capacity of the single computer system itself, which is limited by the state-of-the-art of available computing hardware. As a result, it is difficult to scale the performance—and thus the production output—of the existing crowd simulation products.

As well known in the art, one way to scale the performance of a computer system without being limited by hardware capacity of a single computing unit is to employ parallel processing by utilizing multiple processors or multiple computers. However, generic parallel processing techniques as known in the art are not always the most efficient method of scaling performance for animation in general and crowd simulation in particular due to the nature of computer graphics animation and crowd simulation. For example, in most crowd simulation animation frames, only a small portion of a particular frame contains graphics objects—such as the human characters—that are being animated. Much of the frames—such as the terrain or scenery—do not change much, if at all, in most cases. Thus, applying parallel processing techniques by brute force on entire frames is not an efficient use of computing resources, as much of the parallel processing goes to recreating or duplicating graphics that do not change at all. What is needed to provide proper performance scaling for animation and crowd simulation is a more intelligent approach to parallel processing that takes into account the inherent characteristics peculiar to computer graphics animation and crowd simulation tasks.

Another shortcoming of the existing crowd simulation technologies is that they provide only limited capabilities to make the animated characters or crowd appear realistic or intelligent. Existing solutions employ limited "intelligent" techniques such as fuzzy logic and rule-based animation state manipulation. However, since the task of making crowd appear more realistic and intelligent is essentially a task of emulating intelligent behavior, a more effective approach is to apply machine learning techniques such as the Neural Networks and/or genetic algorithm methods which are the state-of-the-art technologies for emulating intelligent behavior. Nevertheless, none of the existing crowd simulation solutions incorporates the state-of-the-art machine learning techniques at present.

It can be seen, then, there is a need in the field for a computer graphics animation and crowd simulation solution that incorporates intelligent parallel processing for proper scaling of performance as well as intelligent animation techniques for emulating intelligent behavior.

SUMMARY OF THE INVENTION

Accordingly, the present invention addresses the foregoing need by providing a method and a system for intelligent scalable animation with intelligent parallel processing engine and intelligent animation engine.

Scalable animation capability of the present invention is based on a client-server architecture. The present invention first identifies the animation tasks that can benefit from parallel processing—called "parallelizable" tasks—and those that cannot—i.e., non-parallelizable tasks. Then, the parallelizable tasks are placed on scalable servers for parallel processing, and the non-parallelizable tasks are placed on a client machine for local processing.

For crowd simulation, a preferred embodiment of the present invention divides up the animation tasks into world space transformation and local transformation, and places world space transformation on scalable servers and local transformation on client computer. World space transformation comprises animation of all of the performers in a scene or frame. Local transformation comprises animation of performers in a particular area of the scene, called a region of interest (ROI). Due to the nature of crowd animation, world space transformation scales well, and hence placed on scalable servers, while local transformation scales poorly, and hence computed on client machines. This is a novel and effective method of dividing up animation tasks for crowd simulation that allows scalable performance by parallel processing on scalable servers.

According to another aspect of the invention, the present invention provides novel means for parallel processing of animation tasks. Traditionally, parallel processing of graphics computing task is done by dividing up the graphics objects by grids or meshes. The present invention takes a more intelligent, novel approach to dividing up the parallel processing tasks. A scene is partitioned in a manner that maximizes the efficiency of animating performers across a given number of available servers.

According to yet another aspect of the invention, the present invention provides a novel, intelligent animation engine. A performer's behavior is defined by one or more state machines associated with the performer. The state machines can be specified and modified by an graphical user interface (GUI), as well as by utilizing a scripting language. Furthermore, the state machines can be trained to emulate intelligent behaviors by employing the state-of-the-art artificial intelligence (AI) technologies such as the Neural Network and genetic algorithm. Utilizing the techniques from Neural Network and/or genetic algorithm, the performers, or the state machines associated with the performers, can also learn from past experience and modify their behavior accordingly.

According to another aspect of the invention, the present invention is a method for intelligent animation utilizing optical flow analysis. The well known methods of optical flow analysis is employed to extract movement guide data from a given sequence of image frames. The extracted movement guide data is then used to determine the animation behavior of the performers, including training the performer behaviors from the guide data.

The present invention also provides realistic and intelligent animation behavior by utilizing communication between the performers. The performers can be spatially and logically partitioned to allow performers to react in clusters or teams, or to form complex strategies based on the ranking structure defined within a team.

Other and further objects and advantages of the present invention will be further understood and appreciated by those skilled in the art by reference to the following specification, claims, and drawings.

BRIEF DESCRIPTION OF THE DRAWINGS

Referring now to the drawings in which like reference numbers represent corresponding parts throughout.

DETAILED DESCRIPTION OF THE INVENTION

Figure 1:
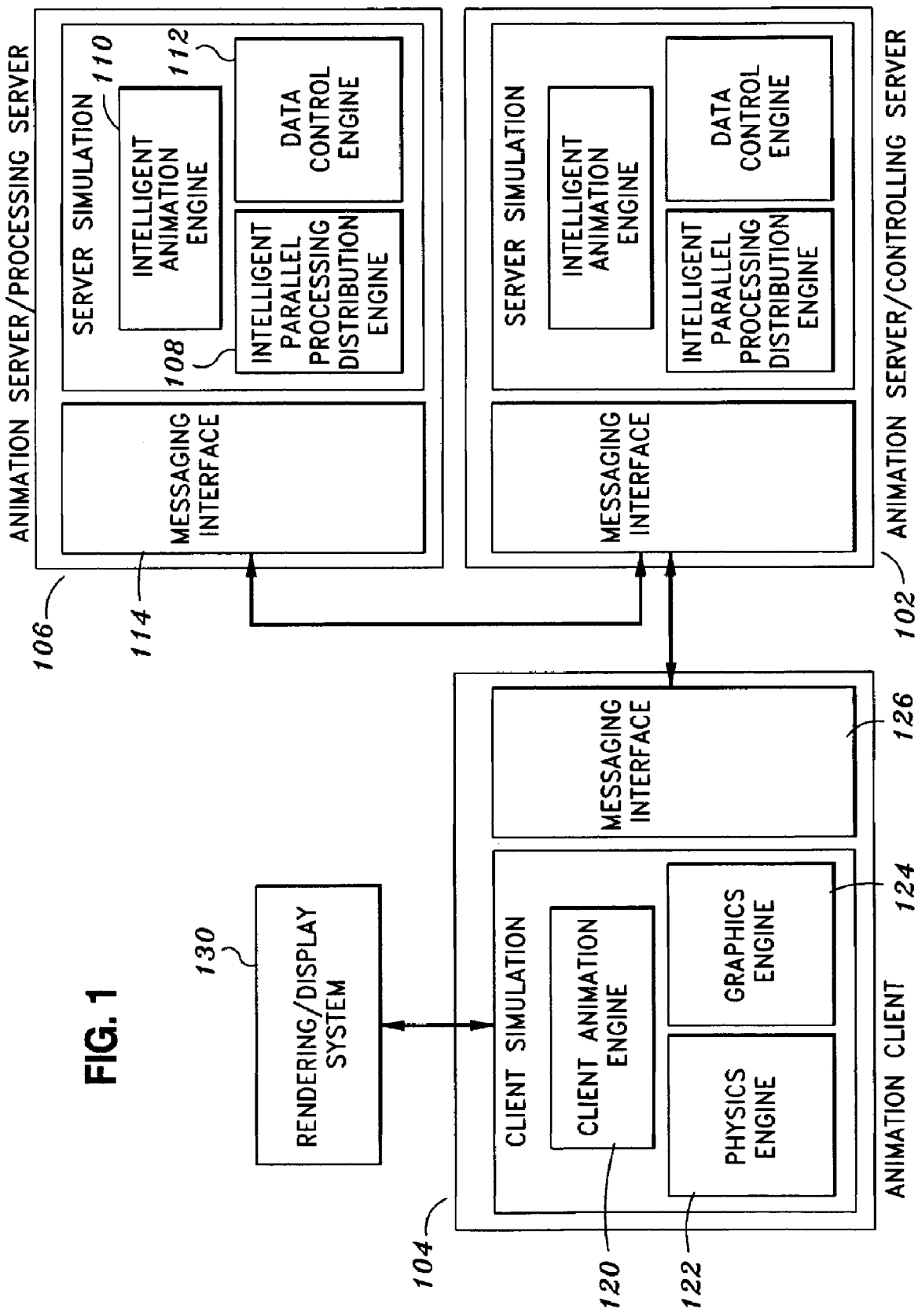
FIG. 1 illustrates a conceptual block diagram of a system architecture according to the present invention.

FIG. 1 illustrates a conceptual block diagram of a system architecture according to the present invention. As shown in FIG. 1, the present invention is based on a client-server architecture. According to one aspect of the invention, the present invention is a system for intelligent scalable computer animation comprising at least one scalable animation server for executing parallelizable animation tasks and an animation client for executing non-parallelizable animation tasks. In a preferred embodiment, the system of the present invention comprises at least a controlling animation server (102) and an animation client (104). As also shown FIG. 1, when more than one animation servers are available, one of the servers is designated as controlling animation server (102) while other servers are processing animation servers (106). A server comprises intelligent parallel processing distribution engine (108), intelligent animation engine (110), Data Control Engine (112), and messaging interface (114).

Intelligent parallel processing distribution engine (108) coordinates the division and distribution of parallelizable or scalable animation tasks across one or more available servers. A partition of scalable animation task according to the present invention is called an animation volume. Intelligent animation engine (110) performs the actual server animation tasks, including application of artificial intelligence (AI) algorithms to animation. Data Control Engine (112) performs data coordination tasks across animation volumes. Messaging interface (114) provides communication mechanism between a client and a server as well as between multiple servers. Messaging interface (114) can be any interprocess communication mechanism known to those skilled in the art, including, SOAP (Simple Object Access Protocol), WinSock, TCP/IP Socket, RCP, and pipes, without departing from the scope of the present invention.

As also shown in FIG. 1, animation client (104) comprises client animation engine (120), Physics Engine (122), Graphics Engine (124), and a messaging interface (126). Client animation engine (120) performs the local animation tasks that typically do not scale well, including modification to animation due to local obstacles and geometric transformations. Physics Engine (122) computes and applies physics details such as motion of moving bodies, and Graphics Engine (124) performs rendering and drawing. Messaging interface (126) provides communication mechanism between a client and a server. In a preferred embodiment, the system of the present invention further comprises rendering and display system (130) for rendering and displaying animation graphics.

Figure 2:
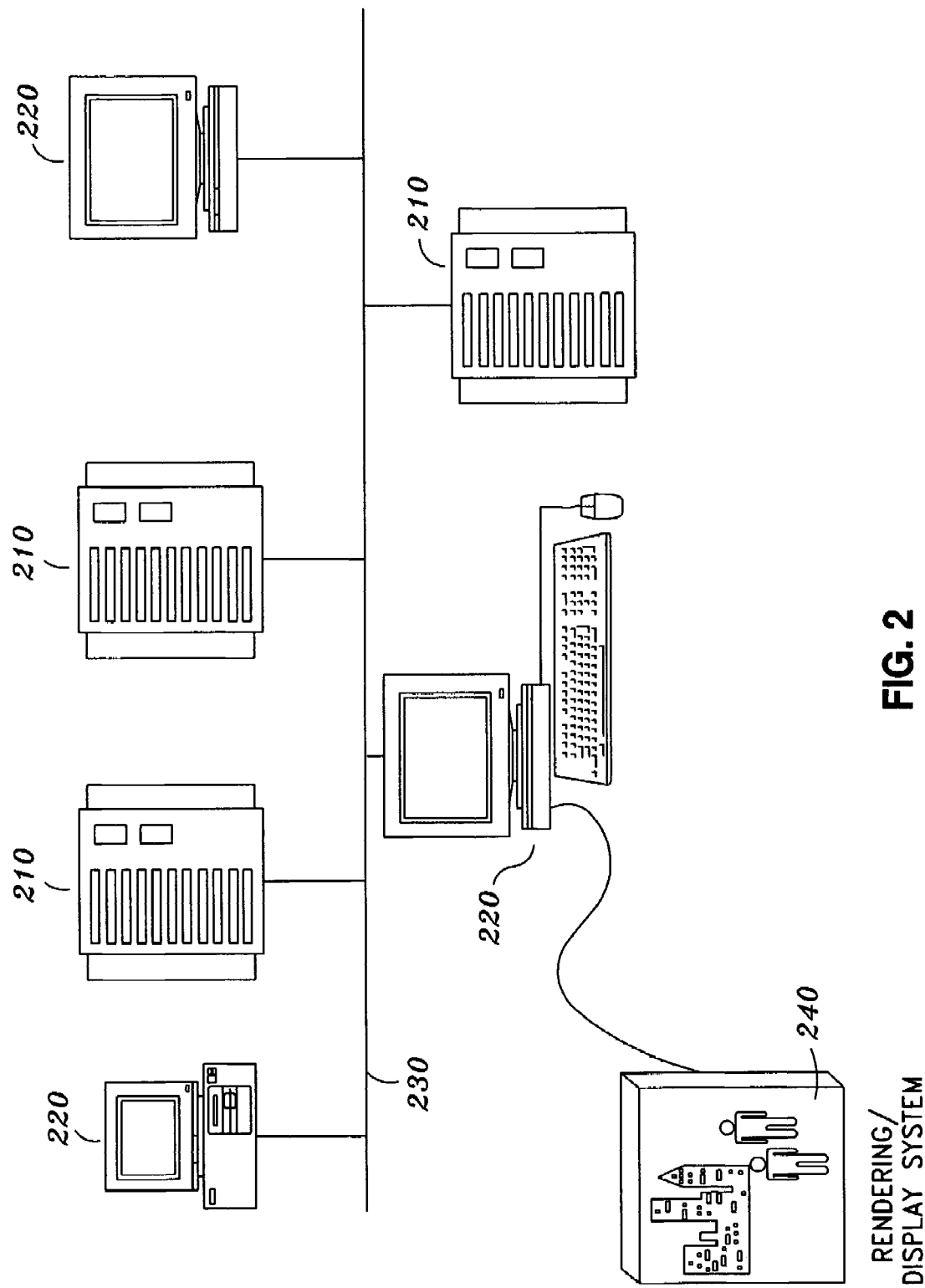
FIG. 2 illustrates the hardware environment for the present invention.

FIG. 2 illustrates the hardware environment for the present invention, which comprises one or more servers (210), one or more client computers (220), and a network (230). The hardware environment can further include a rendering or display system (240). A server can be any server class computer with one or more CPU, a hard disk, and sufficient memory to support server class computation. A client computer can be any suitable client computer known to those skilled in the art, including a PC and a workstation. A client computer typically has a CPU, a hard disk, sufficient memory to support graphics computation, a graphics adapter, a display monitor, a keyboard, and a pointing device such as a mouse. Client and server can also be placed in the same physical machine. It should be noted that animation servers (102 and 106) and animation client (104) are logical units which can be placed in the same physical computer. Rendering or display system (240) can be a graphics card with sufficient memory and processing power to handle animation graphics. It can also be separate hardware, including dedicated animation graphics machine and virtual reality display devices without departing from the scope of the present invention.

In another aspect of the invention, the present invention is a method for scalable computer animation, including, identifying parallelizable animation tasks, identifying non-parallelizable animation tasks, and, for a given animation frame, subdividing animation tasks for the animation frame into parallelizable animation tasks and non-parallelizable animation tasks. The parallelizable animation tasks are executed on one or more scalable animation servers, and the non-parallelizable animation tasks are performed on an animation client. A preferred embodiment of the present invention identifies world transformation animation tasks as parallelizable animation tasks, identifies local transformation animation tasks as non-parallelizable animation tasks, divides up the animation tasks into world space transformation and local transformation, and places world space transformation on scalable servers while performing local transformation on client computer. World space transformation comprises animation of all of the performers in a scene or frame. Local transformation comprises animation of performers in a particular area of the scene, called a region of interest (ROI).

Figure 3:
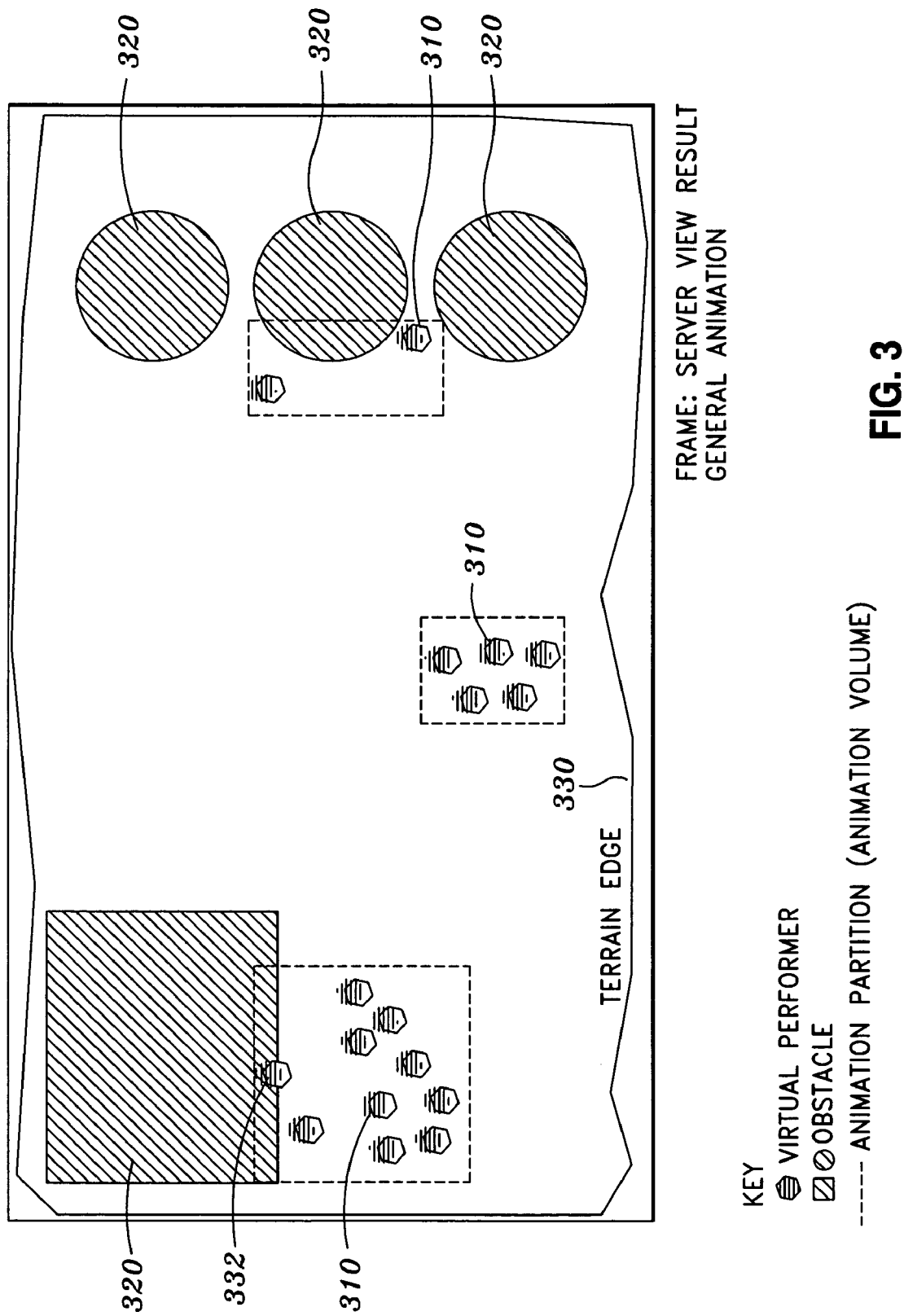
FIG. 3 illustrates animation of performers or world space transformation at the server according to the present invention.

FIG. 3 illustrates animation of performers, i.e., world space transformation, at the animation server. As shown in FIG. 3, an animation frame can comprise performers (310), obstacles (320), and terrain (330). Performers (310) are typically digital animation characters, and sometimes called digital performers or virtual performers. According to the present invention, performers (310) are animated at the server according to the rules specified for the performers without regard to local variations. For example, performer (332) is in an illegal position overlapping an obstacle (320), but the performer is animated at the server without accounting for the obstacle. Such disregard of local variations at the server allows the animation tasks for animating the performers to be easily parallelizable—that is, to be partitioned and distributed among scalable servers.

Figure 4:
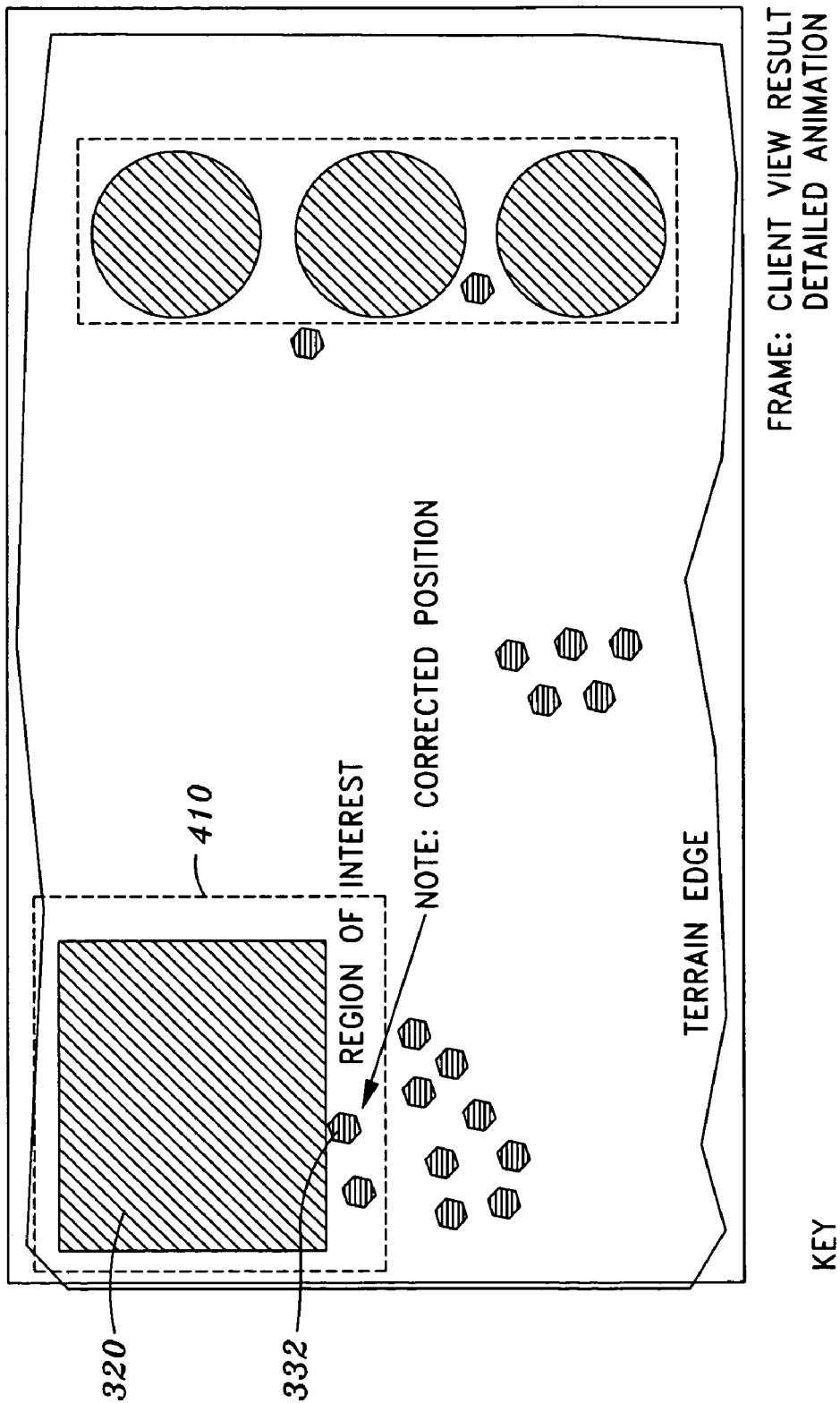
FIG. 4 illustrates animation of performers or local transformation at the client according to the present invention.

FIG. 4 illustrates animation of performers at the client, which is local transformation. At the client, the world transformation is further modified to modify animated behavior in light of local conditions such as obstructions or obstacles. As shown in FIG. 4, performer (332) in an illegal position created as the result of world transformation at the server is modified or corrected, taking local obstruction conditions, overlapping obstacle (320), into account.

World space transformation scales well, since it is concerned with animating performers in general. In contrast, local transformation scales poorly because it relates to only specific areas of a scene, called regions of interest (410), as illustrated in FIG. 4. Thus, world space transformation is performed on scalable servers and local transformation is performed on client computers.

According to yet another aspect of the invention, the present invention provides novel means for parallel processing of animation tasks. Traditionally, parallel processing of graphics computing task is done by dividing up the graphics objects by grids or meshes. The present invention takes a more intelligent, novel approach to dividing up the parallel processing tasks. A scene is partitioned in a manner that maximizes the efficiency of animating performers across a given number of available servers.

Figure 5:
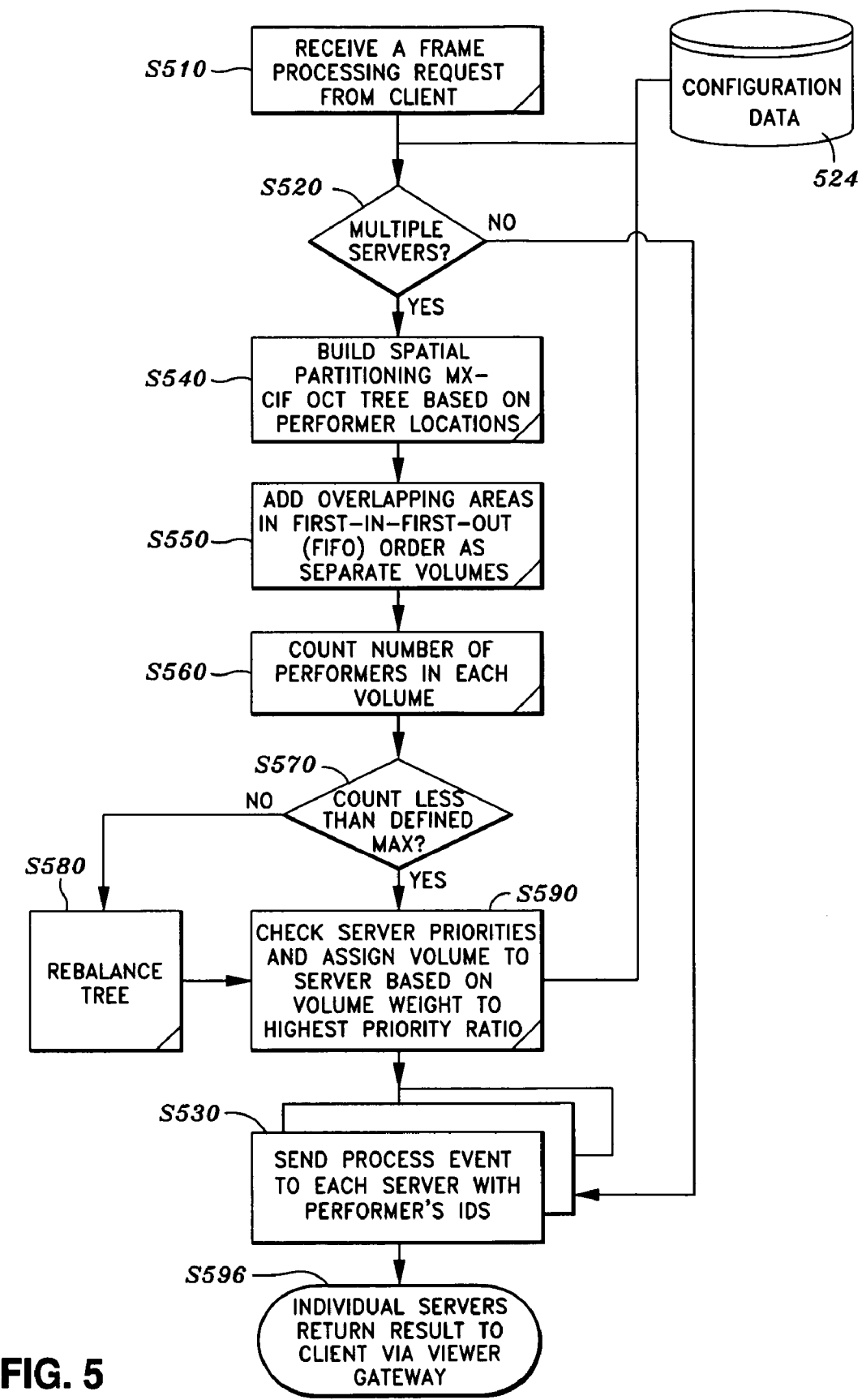
FIG. 5 illustrates the intelligent parallel processing algorithm according to the present invention.

FIG. 5 illustrates the intelligent parallel processing algorithm according to the present invention. Intelligent parallel processing distribution engine (108) of the present invention makes use of two categories of criteria for determining partitioning of performers: spatial and statistical. Once a frame processing request is received from the client (Step 510), a check is done to determine if parallel processing is possible (Step 520). If only a single server exists according to the configuration data (524), then the distribution method is skipped and that server is utilized to processing tasks (Step 530). However, if multiple servers exist, a spatial model is utilized to determine volumes (bounding boxes) where performers are located in close proximity with each other. To accomplish this, an Oct-Tree data structure is employed with a spatial partitioning criteria, and a spatial partitioning Oct-Tree is built based on Performer locations (Step 540). In order to maximize efficiency, the number of volumes generated are at least the number of servers available on the network. Due to the nature of spatial partitioning trees, there may be area where these volumes overlap. Those areas are added to a first-in-first-out (FIFO) queue for separate processing (Step 550). Additionally, in order to limit the load on any given server, once a user defined maximum number of performers for containment in a single volume has been reached, the volume is divided in half and the tree data structure is re-balanced so that all over-filled volumes have been sub-divided. The number of Performers in each volume is counted (Step 560), which is compared to the user defined maximum number of performers in a volume (Step 570). If the count is greater than the maximum number, the Oct-Tree is rebalanced (Step 580) using a tree balancing algorithm well known to those skilled in the art of programming. The closest edges of each volume are then tagged and a weighting is determined based on the likelihood of a performer to travel across a volume boundary. The volumes with the highest weightings are grouped together for processing on the same server, if possible. Each performer is assigned the statistical weighting based on proximity to boundary edges and tagged areas of interest. Areas of interest are terrain edges, volume boundaries, and user defined trigger areas. The weights are then calculated and run through a statistical process based on previous frames using a median of previous weightings and a bias to skew the result curve. The volume's node weightings are then counted. The volumes with the highest weighting are sent to the servers with the highest priority for processing (Step 590). This results in highly coupled blocks communicating locally instead of over the network. All of the performers are animated on scalable servers (Step 530) according to the specified rules, and the servers return animation results to the client (Step 596). Then, as described above, modifications of animated behaviors specific to regions of interest are computed on the client computer.

According to yet another aspect of the invention, the present invention provides a novel, intelligent animation engine. A performer's behavior is defined by one or more state machines associated with the performer. The state machines can be specified and modified by an graphical user interface (GUI), as well as by utilizing a scripting language. Furthermore, the state machines can be trained to emulate intelligent behaviors by employing the state-of-the-art artificial intelligence (AI) technologies such as the Neural Network and genetic algorithm. Utilizing the techniques from Neural Network and/or genetic algorithm, the performers, or the state machines associated with the performer, can also learn from past experience and modify their behavior accordingly.

Figure 6:
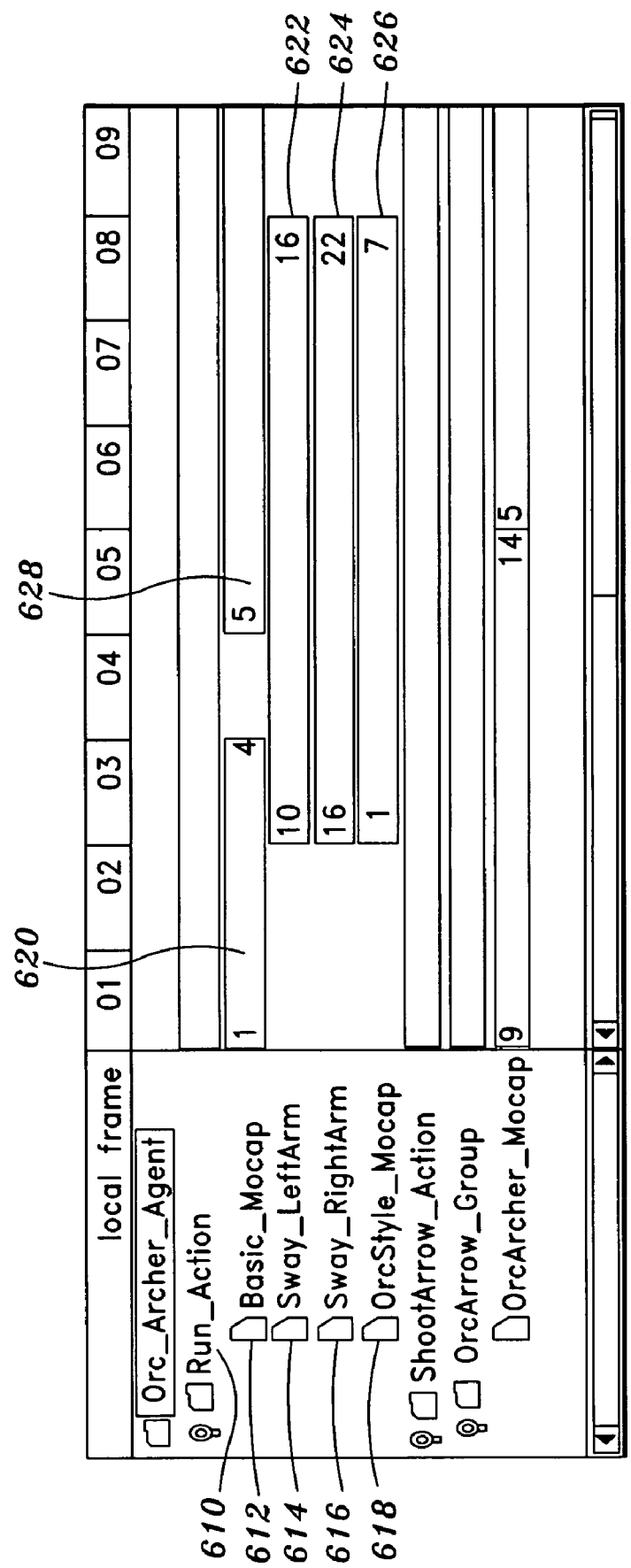
FIG. 6 and FIG. 7 illustrate graphical user interface (GUI) for specifying and modifying the state machines associated with performers according to the present invention.
Figure 7:
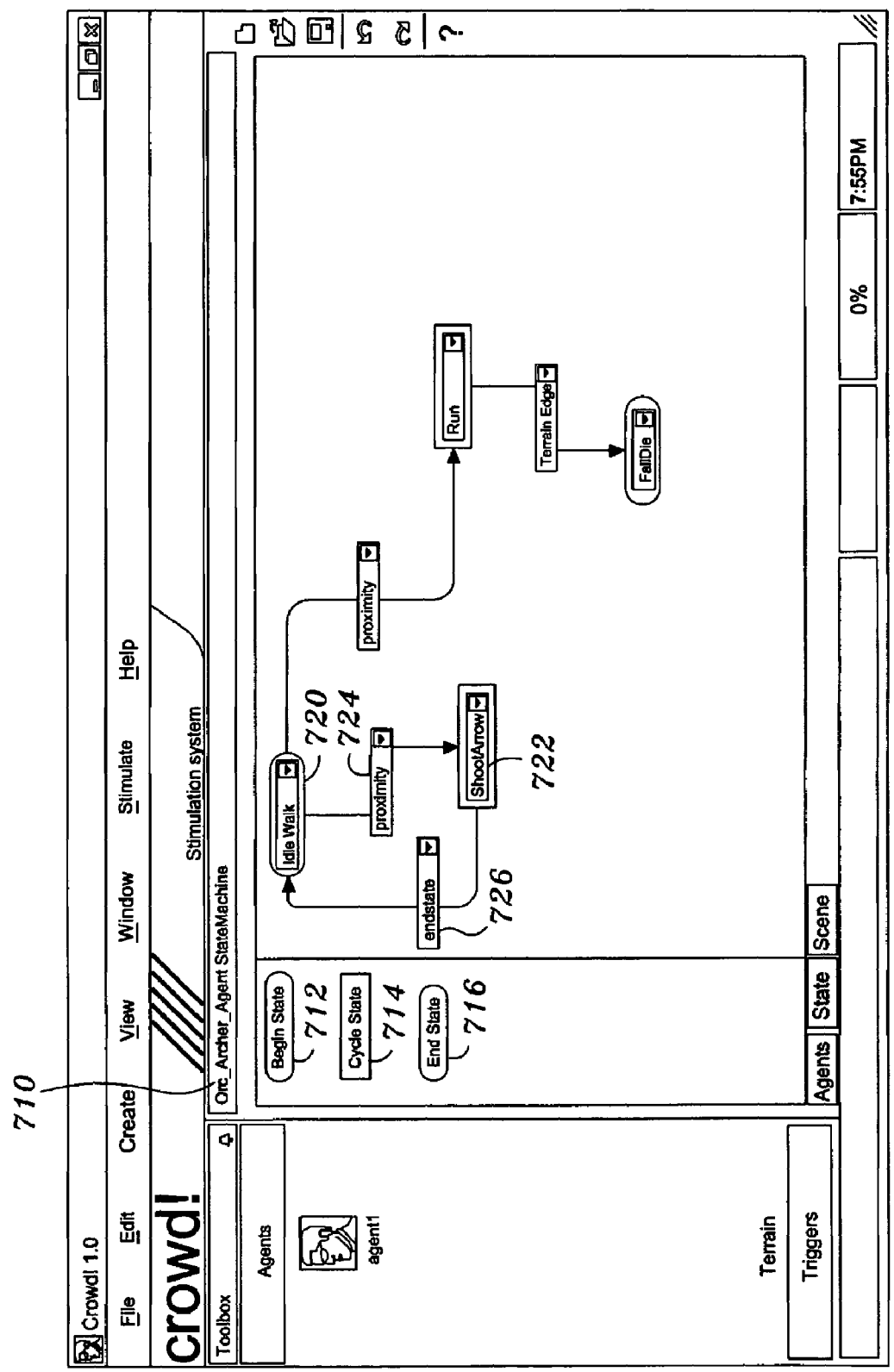

FIG. 6 and FIG. 7 illustrate graphical user interface (GUI) for specifying and modifying the state machines associated with performers. According to the present invention, an animation state machine comprises one or more animation actions which, in turn, comprise animation actions or basic animation units. FIG. 6 illustrates the Action Editor graphical user interface according to the present invention. As shown in FIG. 6, Run_Action (610) animation action comprises Basic_Mocap (612) (for a motion capture animation), Sway_LeftArm (614), Sway_RightArm (616), and OrcStyle_Mocap (618) animation units or state machines. These animation actions may be imported from pre-existing animation libraries or modules as basic animation units. The component animation units can also be previously defined animation actions or state machines. As also shown in FIG. 6, individual animation units can be placed in temporal relation to each other to create complex, composite animation behavior. For example, Run_Action (610) animation action begins with Basic_Mocap action cycle (620), followed by simultaneous initiation of Sway_LeftArm action (622), Sway_RightArm (624), and OrcStyle_Mocap (626) action cycles. Then, Basic_Mocap action cycle (628) is resumed.

An individual animation unit can be created by importing the animation from motion capture or other animation programs. An animation unit can also be created by specifying a state machine of basic individual motion animation. FIG. 7 illustrates animation State Machine Editor according to the present invention. As shown in FIG. 7, OrcArcher_Agent animation state machine (710) is created by specifying its Begin State (712), Cycle State (714), and End State (716). As shown, for each of these state phases, a state can be chosen by selecting an available basic unit from a dropdown box list. As also shown, a transition function—i.e., a condition or trigger for transitioning from one state to another—can also be selected from the available dropdown box list. FIG. 7 shows IdleWalk (720) animation state selected from a dropdown box, transitioning to ShootArrow (722) state when Proximity (724) transition event is triggered. ShootArrow (722) state, in turn, transitions back to IdleWalk (720) animation state, when EndState (726) transition event is encountered.

Figure 8:
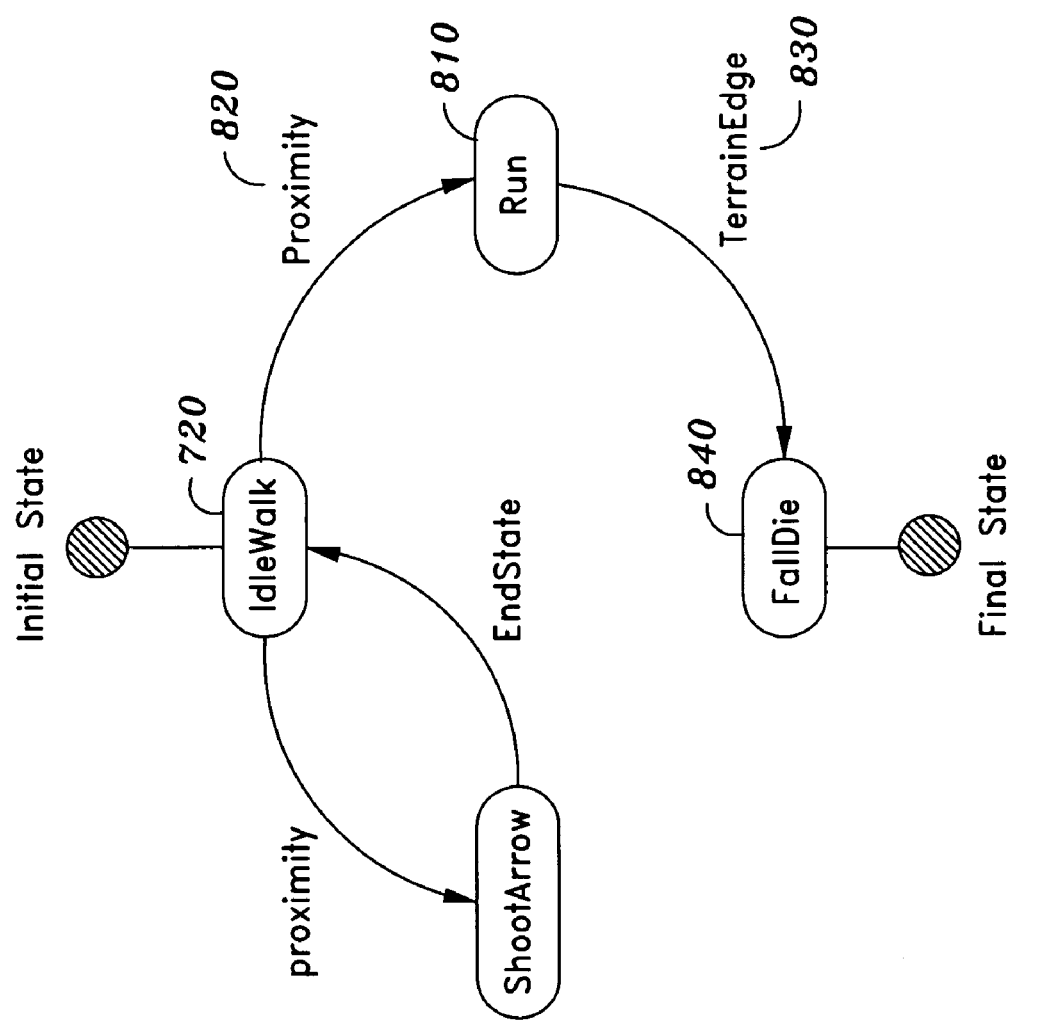
FIG. 8 shows an example of an animation state machine corresponding to the specification shown in FIG. 7.

FIG. 8 shows an example of an animation state machine corresponding to the specification shown in FIG. 7. As shown in FIG. 8, IdleWalk (720) animation state transitions to Run (810) state when Proximity (820) transition event occurs. The performer is in Run (810) animation state until TerrainEdge (830) event is encountered, whereupon it transitions to FallDie (840) state.

Figure 9:
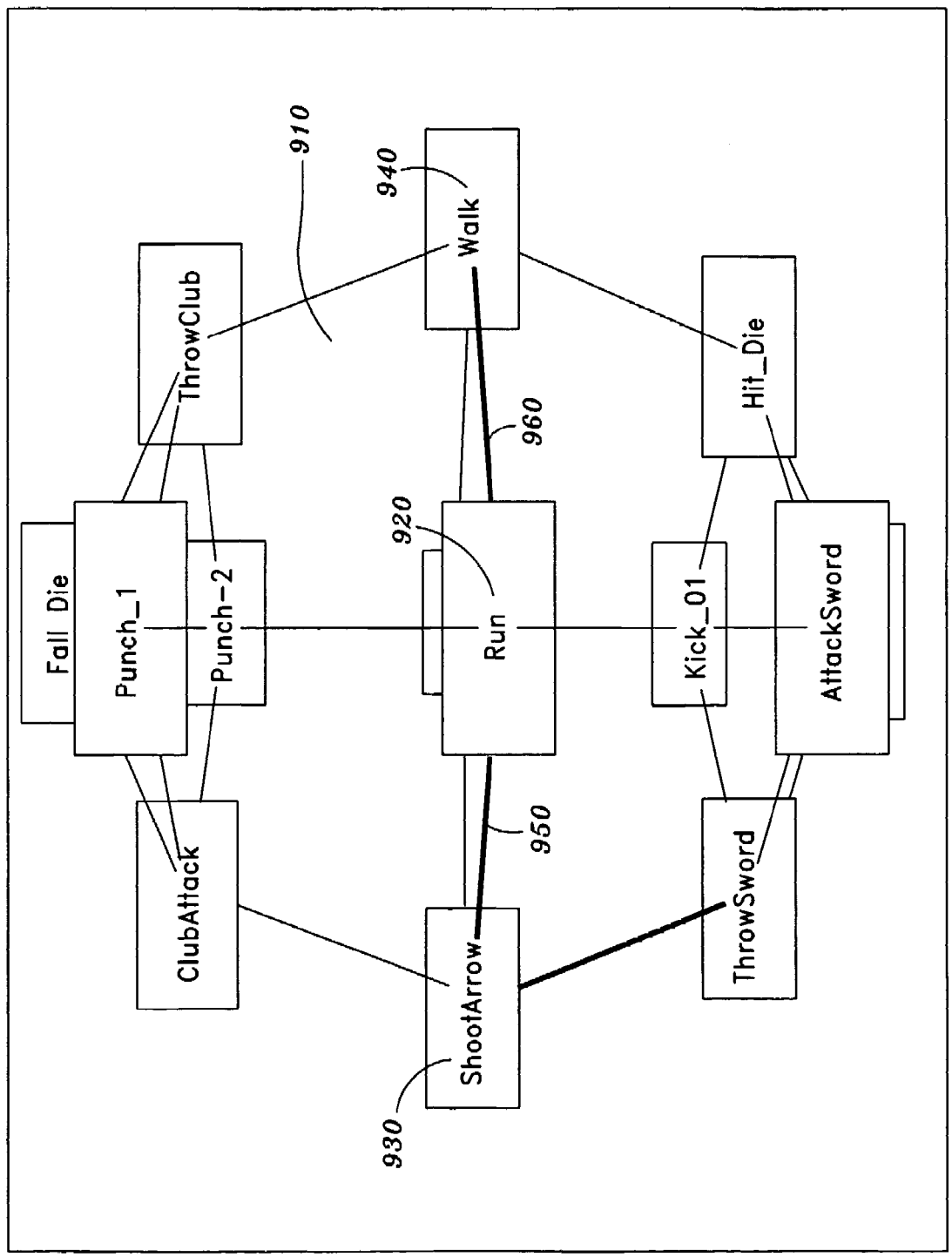
FIG. 9 illustrates a three dimensional spherical graphical user interface according to the present invention.
Figure 10:
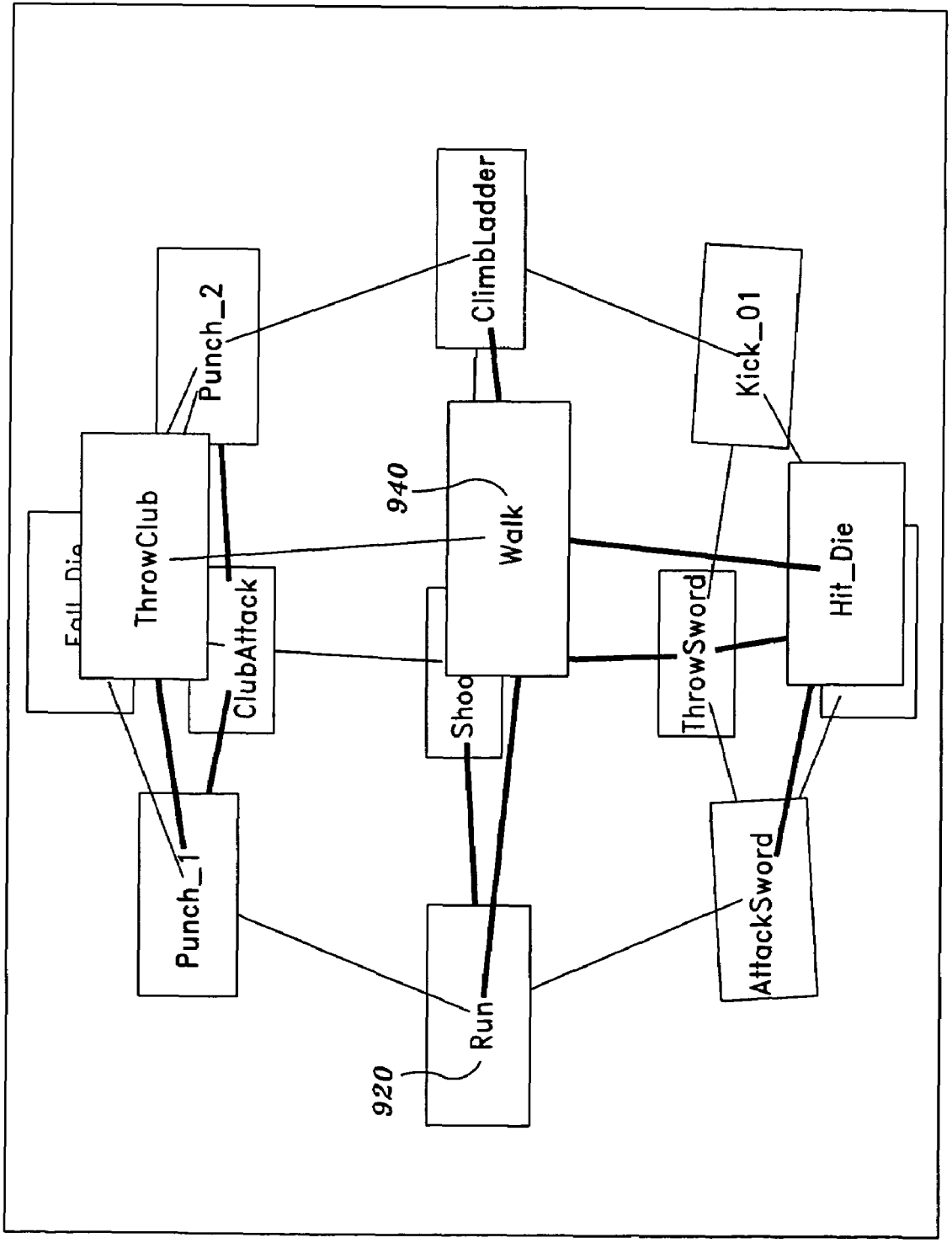
FIG. 10 shows the spherical graphical user interface rotated 80 degrees to the left from the sphere shown in FIG. 9.

In yet another aspect of the invention, the present invention is a three dimensional graphical user interface (GUI) for specifying a state machine. FIG. 9 illustrates a three dimensional graphical user interface according to the present invention. As shown in FIG. 9, a preferred embodiment of the GUI of the present invention is a three dimensional sphere with state labels facing the user. The logically determined connections of states and state transitions are shown in bold. The user can view and manipulate complex state relationships by interacting with the three dimensional sphere representation (910) shown in FIG. 9. As shown in FIG. 9, Run state (920) is in foreground facing the user. It is connected to ShootArrow state (930) to the left and Walk state (940) to the right of the sphere. Note that Run-ShootArrow connection (950) and Run-Walk connection (960) are in bold, indicating that they are logically determined—i.e., permissible—state transitions. When the spherical GUI is rotated using a mouse or a pointing device, the state at the foreground moves back and a background state moves to the front of the sphere. The size of the appearance of the states changes simulating a spherical perspective. FIG. 10 shows the spherical GUI rotated 80 degrees to the left from the sphere shown in FIG. 9. As shown in FIG. 10, Run state (920) has now moved to the left background, and Walk state (940) has moved foreground to the front of the spherical GUI.

Figure 11:
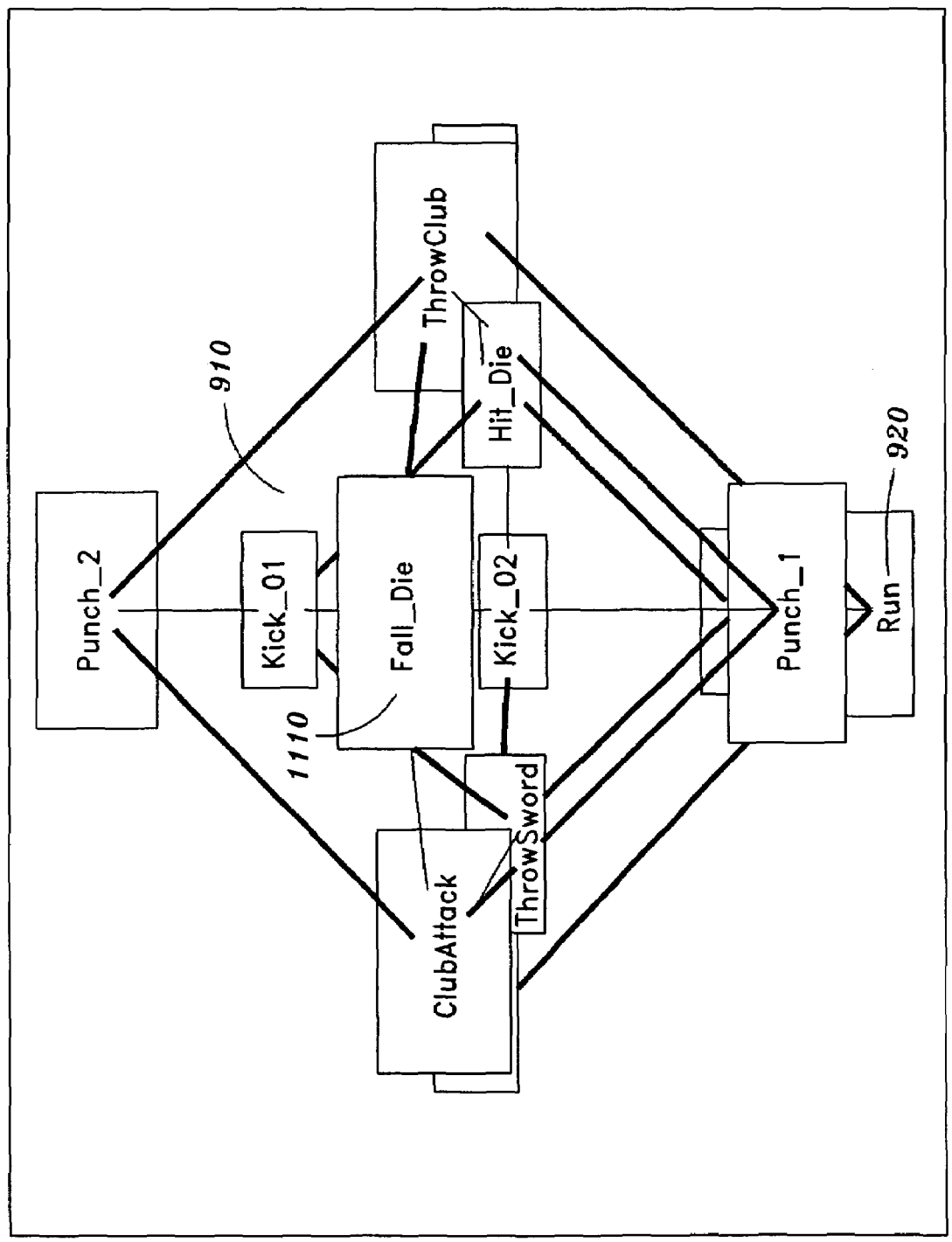
FIG. 11 shows the spherical graphical user interface rotated 80 degrees forward from the sphere shown in FIG. 9.

Similarly, FIG. 11 shows the spherical GUI rotated 80 degrees forward from the sphere shown in FIG. 9. As shown in FIG. 11, Run state (920) has moved to the bottom of sphere (910), and Fall_Die state (1110) is now in the foreground facing the user.

The animation states and connecting transitions represented on the three-dimensional GUI of the present invention can be created and modified in a fashion similar to that of the conventional two-dimensional GUIs described in FIG. 6 and FIG. 7 above. For example, a right-click on Run state (920) can bring up a pop-up menu presenting menu choices to edit, rename, or delete Run state (920). On the other hand, a right-click on anywhere on the surface of sphere (910) may bring up a pop-up menu choice to create or add a new animation state. Similarly, state transitions may be defined, created, added, modified, activated, deactivated, or deleted by a right-mouse-click on any of the connection lines.

Alternatively, the state machines can be specified utilizing a scripting language. The script language according to the present invention is a high-level language similar in many respects to JavaScript language well known to those skilled in the art of computer programming. The scripts are compiled into a binary executable file which is input to intelligent animation engine (110). By converting high-level language scripts into a low-level binary file, the speed of execution is greatly increased. This removes the CPU cost of on-the-fly interpretation of the language.

A detailed language specification is given herein.

Language Specification

In the language specification provided herein, the script language of the present invention is referred to as NeuroScript language.

1. Variables 1.1 Definition

In order to make to language as simple to use as possible, and less likely to generate errors, NeuroScript doesn't "type check" variables. In NeuroScript, a variable is a variable, and it can switch from one representation of the data stored in a variable to another without having to define the type of data it stores.

For example, a variable may be declared as:

var Counter=1;

var StartX=1.3933;

var ActorName="Lothar the Magnificent";

Notice that all variables start with the indicator "var" and not a type: "int", "float", or "string".

The implication of this is that we may switch from one type of data to another without any barriers.

For example, var X;

X="Big Dog";

X=99;

X=3.1416;

X=false;

These are all legal within the NeuroScript language since type checking is not enforced. Thus, a variable may contain Boolean, Integer, Float, and String values.

1.2 Escaping Strings

When working with strings, it may sometimes be useful to embed a quotation mark or backslash within a string. Since these are used within the language to indicate the beginning and ending of a string, a special character is required to tell a compiler that you're not trying to define a new string. This character is called an Escape Character. Within NeuroScript, \" is used for escaping double-quotes, and \\ for escape backslashes.

1.3 Arrays

In order to define a set of variables in a list, we may make use of arrays. For the position X, Y, and Z, for example, we may want to use one variable name called position instead of three separate variable names. Arrays may be defined using the bracket pair notation [ ].

For example, var Position [3];

Position [0]=0.0;

Position [1]=1.0;

Position [2]=0.0;

1.4 Left Handed Values

In NeuroScript, variables may only be set on the left hand side.

For example, var X;

X=9; is valid

9=X, is invalid

2. Operators 2.1 Operation Types

NeuroScript supports may types of operations between constants and variables. These operations may be put together to form mathematical expressions.

For example, var X;

var Y;

X=9;

Y=X+1;

These statements will result in the variable X storing the value 9, and the variable Y storing the value 10, which is 9+1. NeuroScript supports many types of operators to create complex expressions (or formulas.)

1. Arithmetic

| Operation | Operator | Explanation |
|---|---|---|
| Multiply | * | |
| Divide | / | |
| Add | + | |
| Subtract | − | |
| Increment | ++ | |
| Decrement | −− | |
| Modulus | % | |
| Exponent | ^ | |
| Concatenate (String) | $ | |

2. Bitwise

| Operation | Operator | Explanation |
|---|---|---|
| And | & | |
| Or | \| | |
| Xor | # | |
| Negate | ~ | |
| Shift Left | << | |
| Shift Right | >> | |

3. Assignment

| Operation | Operator | Explanation |
|---|---|---|
| Add and Assign | += | |
| Minus and Assign | −= | |
| Multiply and Assign | *= | |
| Divide and Assign | /= | |
| Bitwise And and Assign | &= | |
| Bitwise Or and Assign | \|= | |
| Bitwise Xor and Assign | #= | |
| Bitwise Negate and Assign | ~= | |
| Modulus and Assign | %= | |
| Exponent and Assign | ^= | |
| Left Shift and Assign | <<= | |
| Right Shift and Assign | >>= | |

4. Relational

| Operation | Operator | Explanation |
|---|---|---|
| And | && | A Boolean operation to check if both sides of the operator have a result of true. If so, then it returns true, otherwise, it returns false. |
| Or | \|\| | A Boolean operation to check if one side of the operator has a result of true. If so, then it returns true, otherwise, it returns false. |
| Equals | == | A Boolean operation to check if both sides of the operator have the same value. If so, then it returns true, otherwise, it returns false. |
| Not Equals | != | A Boolean operation to check it both sides of the operator have different results. If they have different results, it returns true, if they are equal, then it returns false. |
| Less Than | < | |
| Greater Than | > | |
| Less Than or Equal To | <= | |
| Greater Than of Equal To | >= | |
| Negate | ! or − | A Unary operator that returns the opposite of the value to its right. It the value is true, Negate returns false, and if the value is false, Negate returns true. |

2.2 Order of Operation

When assigning operations, we may run into a conflict when determining which operator should be executed first.

For example,

X=9−5*10;

In this scenario, we may have meant to get the value of 9−5, which is 4, and multiply it by 10 to get the value 40. Or, we may have meant that we want 9 minus the value of 5*10, which it 9−50, or −41.

We follow the operator precedence the same as C and Java. Specifically, the order of precedence is as follows:
1. Parenthesis
2. Exponents
3. Multiplication
4. Division
5. Addition
6. Subtraction

3. Commenting

3.1 Single Line

Comments may be introduced into the code for a single line by using the 11 identifier.

For example,

// This is a comment

3.2 Block

Comments may be placed on multiple lines by created a comment block using the /* identifier to start the comment block, and */ to end the comment block.

For example,

/*
This is a
Multiple line comment
In a comment block
*/

4. Flow Control

4.1 Flow Control Types

NeuroScript supports constructs to control the flow of execution. Two types of flow controls are supported, branching and looping.

```
1. If-Else
    if ( /*expression is true*/ )
    {
        // Do something
    }
    else
    {
        // Expression is false, do something else
    }
2. While
    while ( /* expression is true */ )
    {
        // Do something
    }
3. For
    for ( X=0 /* initialize */; X<20 /*test*/; X++ /*iterate*/ )
    {
        // Do something
    }
```

5. Functions

5.1 Definition

Functions are a block of code in the NeuroScript language that be called elsewhere. A function may take in a set of passed variables and return a resulting value. NeuroScript defines a set of Advanced Programmers Interface (API) functions that be may called. Users may define their own functions by using the "function" keyword.

```
function FuncName ( variable, variable )
{
    // Do Something
}
```

Functions have many uses and may take in a variable set, perform an expression, and return the result.

For example,

```
function Multiply ( A, B )
{
    return A * B;
}
```

Additionally, functions may call other functions from within them.

For example,

```
function MultiplyEx ( )
{
    var X;
    var Y;
    X = 2;
    Y = 9;
    echo ( Multiply ( X, Y ) );
}
```

6. Directives

6.1 #Include

External scripts may be included within a script by using a the "#include" keyword at the point where you want the code included.

For example, include "C:\\MyScripts\\GlobalFunctions.nsl"

6.2 #Define

Constants may be defined within a script to make running the script faster in addition to easing the readability of the code.

For example, define PI 3.14159 define ACTOR "John Suave"

In yet another aspect of the invention, the present invention is a method for intelligent scalable computer animation, comprising, (1) providing at least one scalable animation server, and (2) producing, at the at least one scalable animation server, intelligent animation behavior of a performer according to a process comprising the steps of (a) specifying animation behavior of the performer utilizing one or more animation state machines, (b) specifying animation states of the one or more animation state machines employing an intelligent algorithm, and (c) generating intelligent animation behavior by animating the performer as specified by the animation states. In other words, the present invention provides intelligent animation behaviors of the performers by encoding or specifying intelligent animation behaviors in the animation state machines. The animation states and transition conditions provide effective and convenient means to parameterize intelligent behaviors.

Intelligent algorithm of the present invention can be any intelligent algorithm known to those skilled in the art of computer graphics animation, including, but not limited to, A* algorithm, Navier-Stokes algorithm, neural net, genetic algorithm, expert system, decision theoretic system, Bayesian predictive models, and various optimization algorithms, without departing from the scope of the present invention.

In a preferred embodiment, the present invention provides a machine learning system for specifying animation behavior at scalable animation servers. The machine learning system of the present invention can incorporate any machine learning system known to those skilled in the art including, but not limited to, a neural net learning system, and a genetic algorithm learning system. For a neural net learning system, the present invention provides functions or subroutines to facilitate building and training a neural net learning system. As an illustration for a machine learning system, consider the example of a car race track where virtual car performers are placed on a race track. If every car follows the same logic, they may not change their movements from one run to the next. Thus, it may look like every car with the same AI controller has the same lines it follows on the track. This will result in a less believable or realistic simulation. If a car performer knew, however, that from its last time through the track, a curve is approaching ahead, the performer can anticipate the curve based on this knowledge and accelerate and decelerate accordingly. The learning system of the present invention can factor this knowledge into the performer's logic to add another layer of steering movement that will add to the realism of the animation. Once properly trained the output of the learning subsystem can be used as the performer's animation controller.

Figure 12:
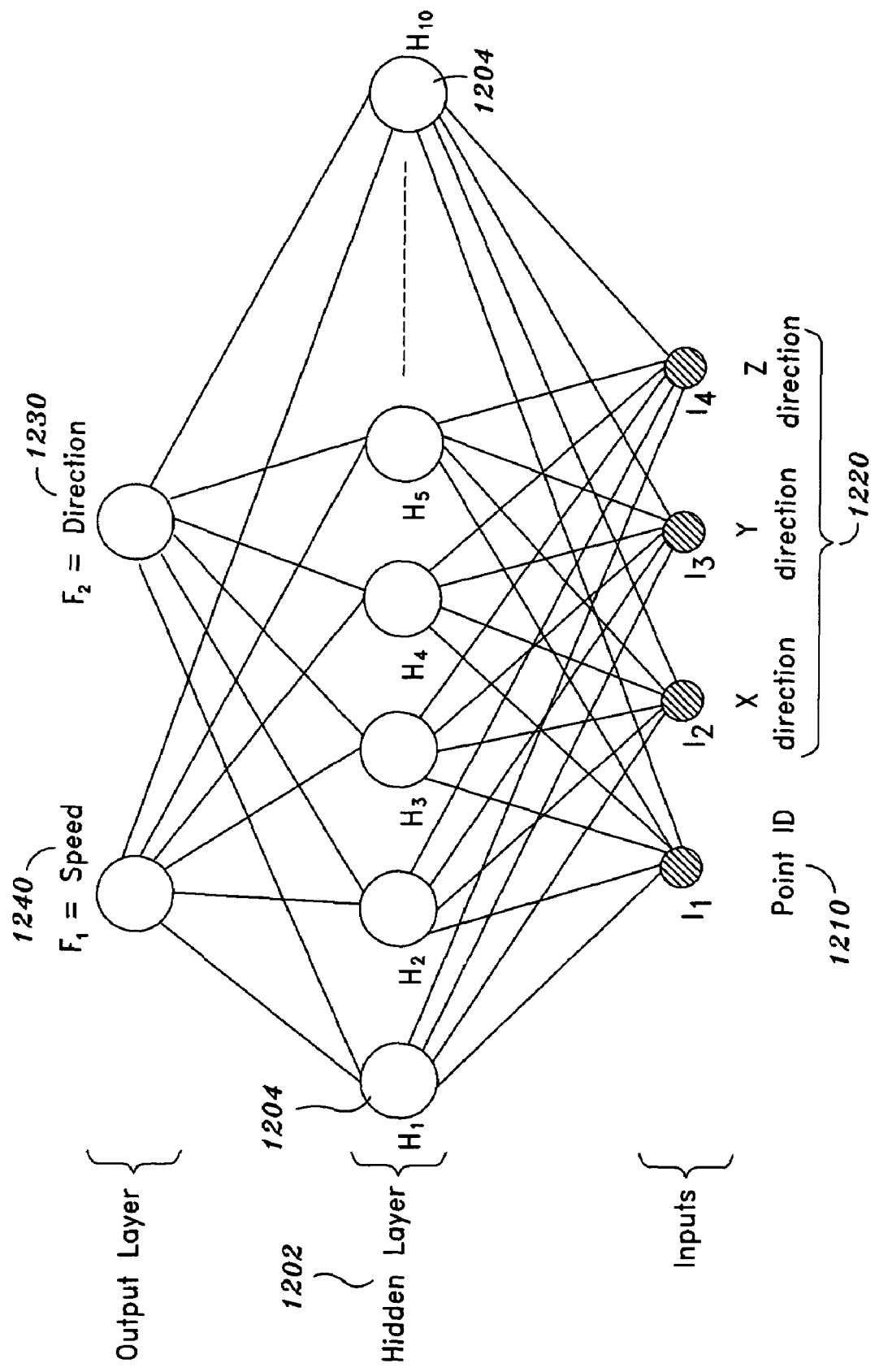
FIG. 12 illustrates a neural net example for a car performer in a car race track.

The techniques for specifying and training a neural net is well known in the art of artificial intelligence (AI). However, its application to animation at scalable animation servers in a client-server environment is novel. Typically, a neural net is specified by defining input and output parameters, number of layers, and number of neurons in each layer. A neural net can be thought of as a trainable nonlinear mapping between input parameters and output variables. FIG. 12 illustrates a neural net for the car performer in a car race track discussed above. In this example, there is one hidden layer (1202) with 10 neurons (1204). The input parameters are Point ID (1210) for a position in the race track, and X, Y, Z directions (1220) of the car performer at Point ID. The output parameters are Direction (1230) state (e.g., left, right, forward, and backward) and Speed (1240) state (e.g., accelerate, maintain, and decelerate). The neural net shown in FIG. 12 can be created by calling NN_createNet( ) function of the present invention, indicating the number of inputs as 4 (1 for the point's id, and 3 for the vector's X, Y, and Z) and the number of outputs as 2. Additionally, the number of neurons is specified as 10, and the back propagation flag is set to True to generate a back propagation neural network. Once the neural network is defined, it can be trained in what is known as the supervised learning mode by training on a set of inputs and outputs. The training set information may be fed into the network directly by running the NN_putWeights( ) function, or indirectly by feeding the input and desired output and running NN_updateNet( ) function for each input on each data set.

When running the animation layer, the Neural Network is queried in the transition functions for the states to determine whether to switch states. However, the present invention also takes into account of other factors such as triggers to determine animation behavior. For example, a trigger telling the performer that there was an explosion in front it, may force a more dramatic behavior such as a sudden hard left turn. Thus, the neural network of the present invention operates as an added layer of animation control in addition to the existing methods.

The present invention can also incorporate Genetic Algorithm based learning system. As well known in the art of AI, Genetic Algorithms are a method to find a valid solution by iterating over all the possible permutations in a set until a suitable permutation is found. In many ways it mimics evolution by "mutating" the set, also know as a chromosome, until it is valid. One example use for Genetic Algorithms is the problem of path finding. The key is in how to encode a chromosome. For example, the values 00 for South, 01 for North, 10 for East, and 11 for West can be used to encode the directions in a path. Then, an array of these values can be utilized to store the next direction that should be traveled along the path in order to reach the desired destination. The present invention provides the function GA_genome( ) to populate the list. A fitness function (to determine whether the result is valid) is defined by passing the fitness script name to GA_update( ) function. This function will mutate the genome and attempt to test it's fitness as a solution. GA_update( ) returns a True when the fitness function returns the value within the given acceptable margin of error. In order to get a valid result, the function needs be iterated over until it returns a valid result.

According to another aspect of the invention, the present invention is a method for intelligent animation utilizing optical flow analysis. The well known methods of optical flow analysis is employed to extract movement guide data from a given sequence of image frames. The extracted movement guide data is then used to determine the animation behavior of the performers, including training the performer state machines from the guide data.

To describe briefly, optical flow analysis applies the methods of differential field theory to the image intensity field of a series of images in order to extract movement information of objects in the image series. Essentially, an object is tracked over sequences of time-ordered images in order to determine the object's movement. The present invention can incorporate any optical flow analysis method known to those skilled in the art, including, but not limited to, Anandan algorithm, various differential methods, frequency-based methods, correlation-based methods, multiple motion methods, and temporal refinement methods, without departing from the scope of the present invention. For detailed description of the optical flow analysis methodologies, see, Michael J. Black, and P. Anandan, "A Model for the Detection of Motion over Time", Proceedings of the International Conference on Computer Vision, 1990. See also, S. Beauchemin and J. Barron, "The computation of optical flow," ACM Computing Surveys, vol. 27, no. 3, pp. 433-467, 1995.

Unlike any other system, the present invention has a unique ability to use information from a film background plate or a user developed "guidance" plate to direct the flow of virtual performers in a scene. This is useful when matching to what has already been shot in camera. The only limitation is that the plate used for tracking needs to be based on a "locked-off" stationary camera. Using this image sequence, it is possible to track the actors moving within a scene. Once the actors moving within a scene have been tracked, the scene can be applied to a different camera that is moving.

For example, having filmed 300 human actors dressed as soldiers running towards each other, 150 from camera left and 150 coming from camera right, optical flow analysis can be used to track the movement of the human actors over the image sequence. These actors will be used as "hero" characters that are leading the charge. By running the track through an optical flow tracking software, for example 2d3's Boujou Tracking package or a command line tracking utility, it is possible to extract the tracking data as a series of curves. The resulting curve data then can be used to directly drive virtual performers that represent "platoon leaders." These higher ranking performers will have a set of virtual performers that follow their lead. In order to allow for a more realistic approach, the curve data may also be fed back into a Neural Network in order to train the network with valid movements for the clusters of virtual performers to provide some degree of movement anticipation based on the terrain.

Figure 13:
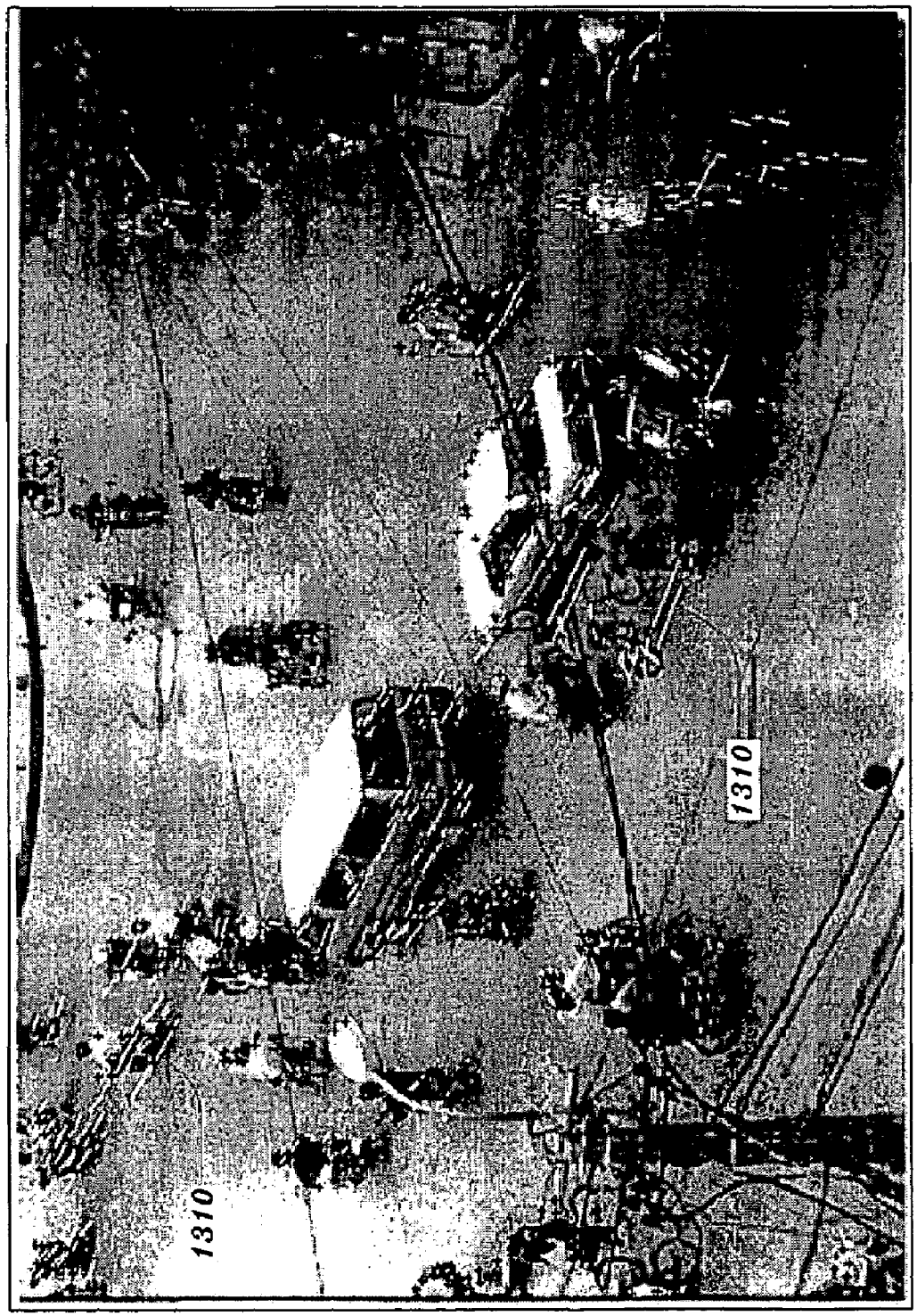
FIG. 13 illustrates tracking data curves overlaid on top of an underlying image.
Figure 14:
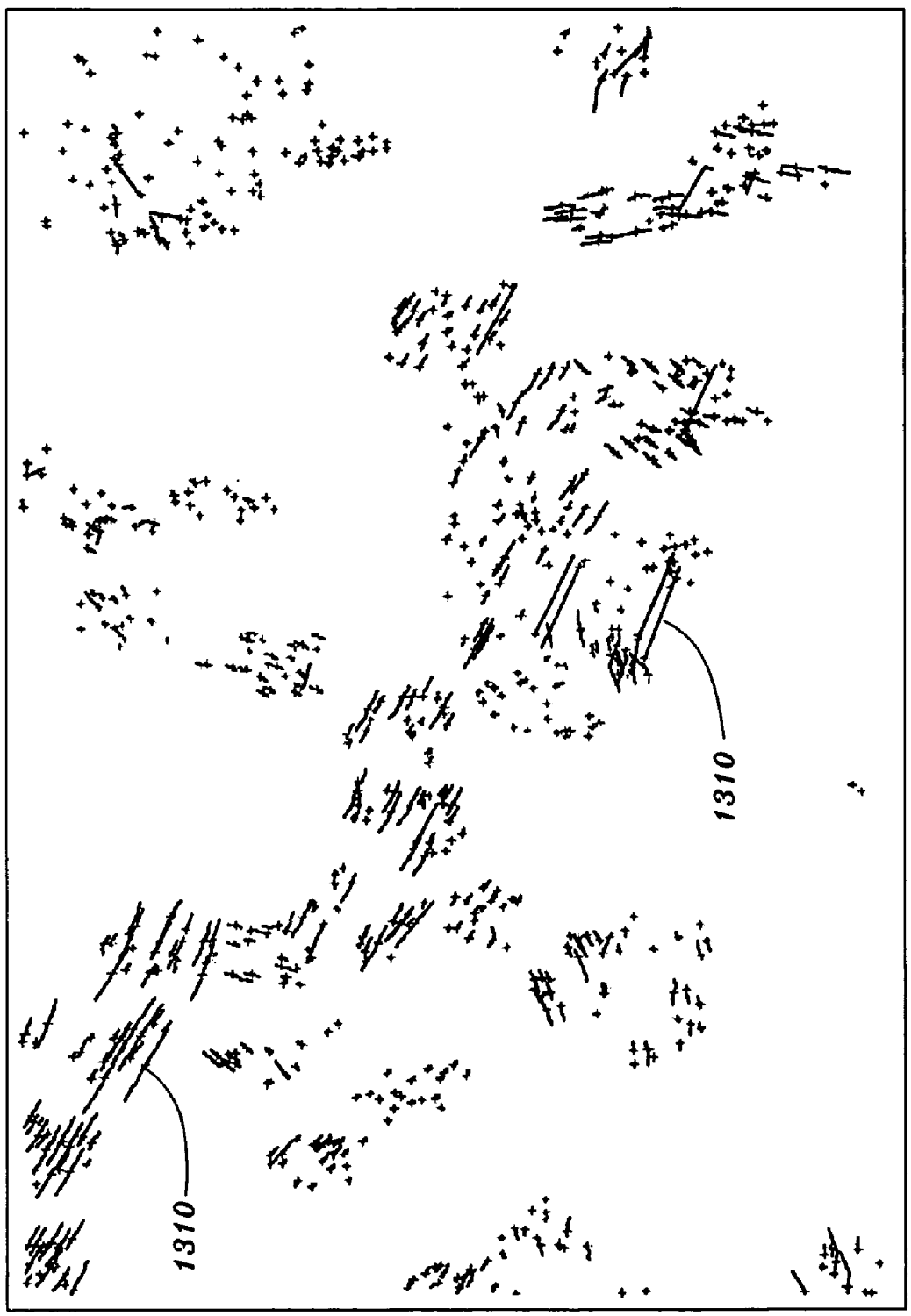
FIG. 14 illustrates the extracted movement tracking curves from the same images as shown in FIG. 13.

FIG. 13 illustrates tracking data curves overlaid on top of an underlying image. As shown in FIG. 13, the curves or lines (1310) around the moving objects—the automobiles, motorcycles, bicycles, and humans—provide movement information for the image objects. FIG. 14 illustrates the extracted movement tracking curves from the same images as shown in FIG. 13.

Figure 15:
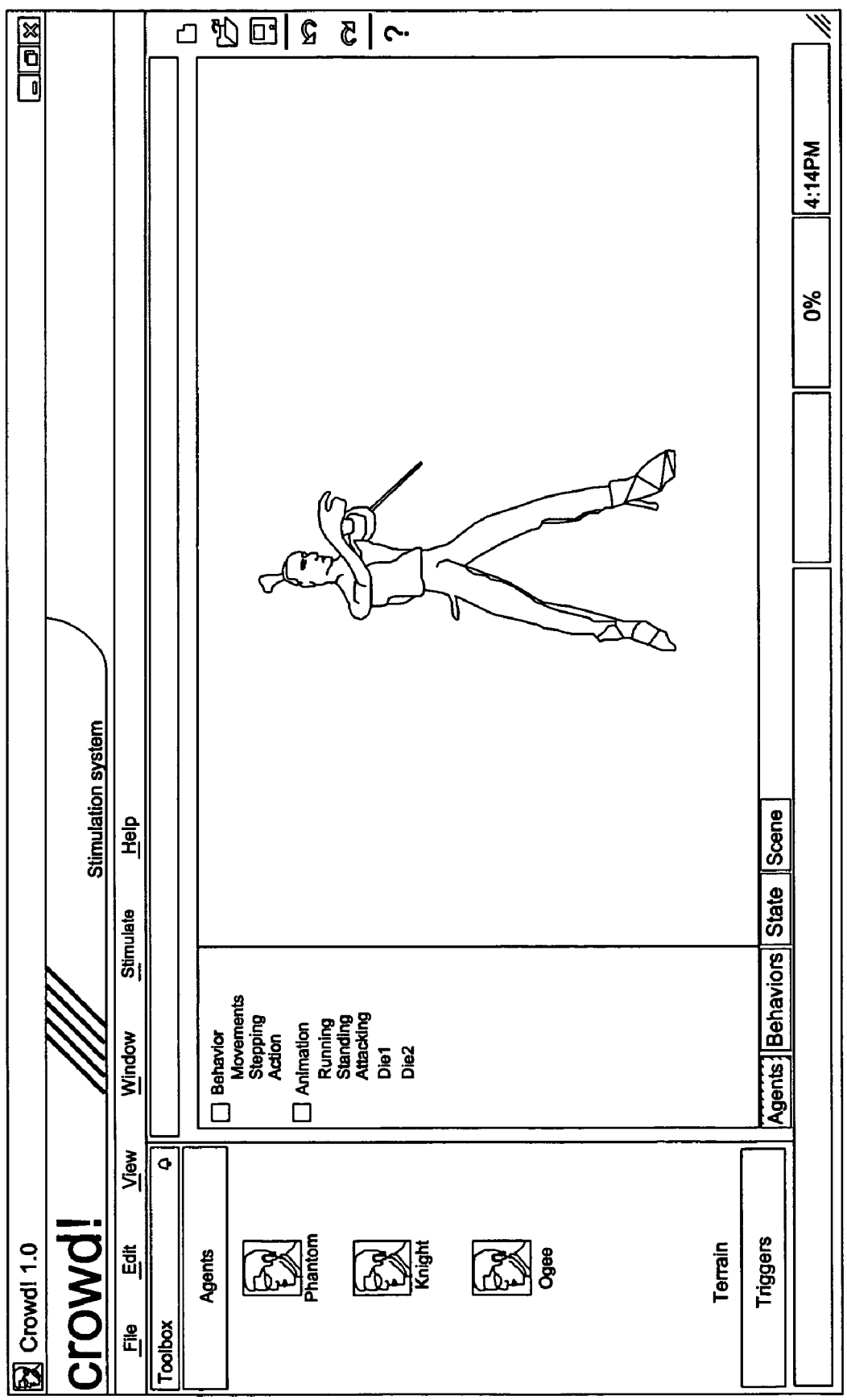
FIG. 15 and FIG. 16 show the general layout and "look and feel" of the client GUI according to the present invention.
Figure 16:
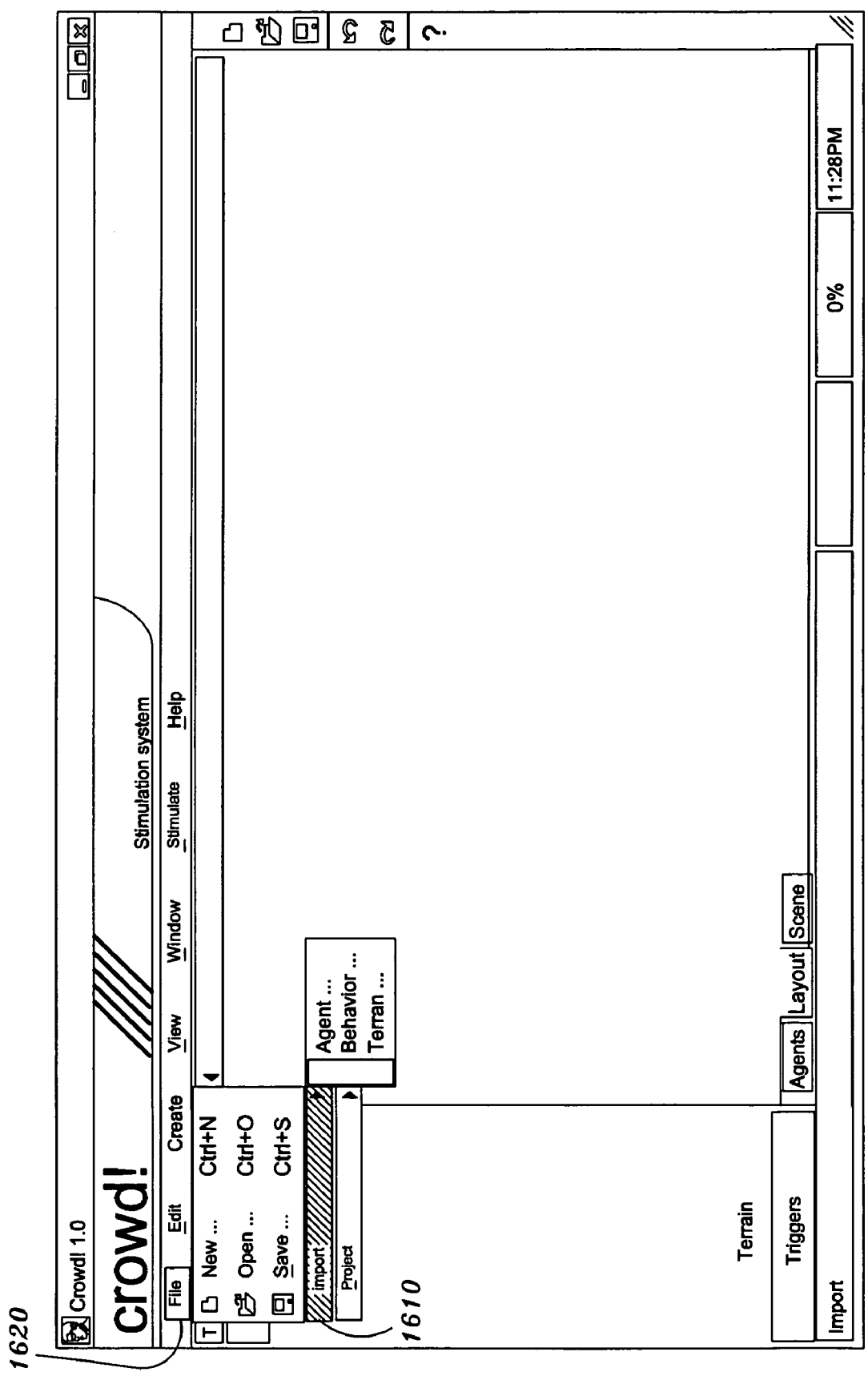

FIG. 15, FIG. 16, FIG. 17, and FIG. 18 illustrate the graphical user interface (GUI) of the present invention for the client computer. FIG. 15 and FIG. 16 show the general layout and "look and feel" of the client GUI according to the present invention. As a client GUI, the present invention is an artist tool. To maintain ease of use and non-threatening appeal of an artist tool, the client GUI of the present invention provides a simple, consistent user interface with the familiar Windows XP look and feel.

Figure 17:
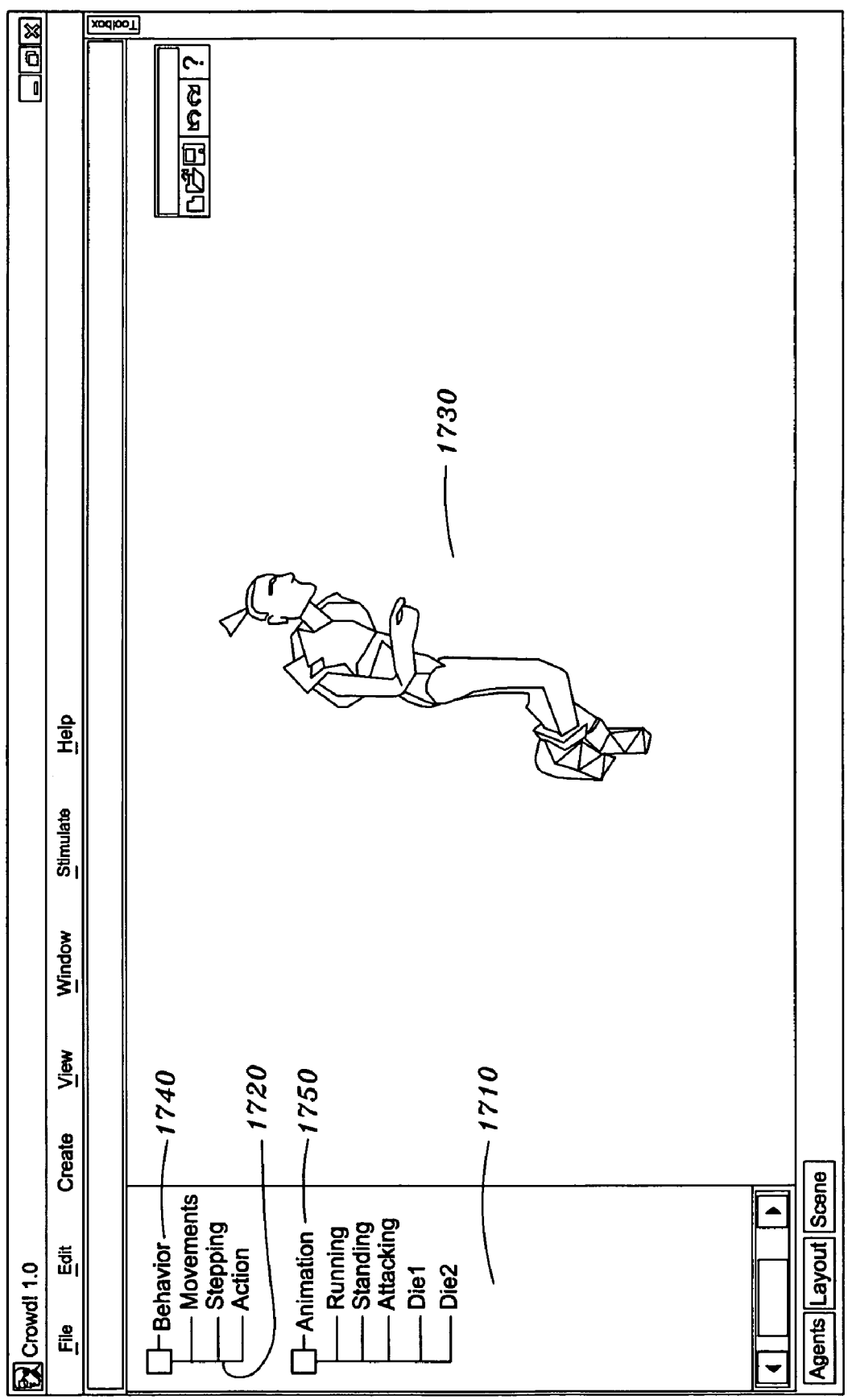
FIG. 17 shows an Agent Editing Panel according to the present invention.

As shown in FIG. 16, the user imports animation graphics at the client computer for a Performer from graphics packages such as Maya utilizing Import function (1610) from a familiar Windows style menu (1620). FIG. 17 shows an Agent Editing Panel according to the present invention. The agent editing area (1710) provides functions to playback animation cycles, edit state machines, and create actions. A tree like view (1720) shows lists of these associated elements along with an OpenGL view (1730) to see how they affect the individual model. The available Behaviors (1740) and Animations (1750) shown in FIG. 17 are created and attached or associated with the imported animation graphics, either before importation or afterwards, by utilizing the state machine editor GUI described in FIG. 6 and FIG. 7 above. The Terrain and Legal Terrain Navigation Areas are also imported. The user can then create instances of the Performers on the Terrain. Created animations can be saved and retrieved.

Figure 18:
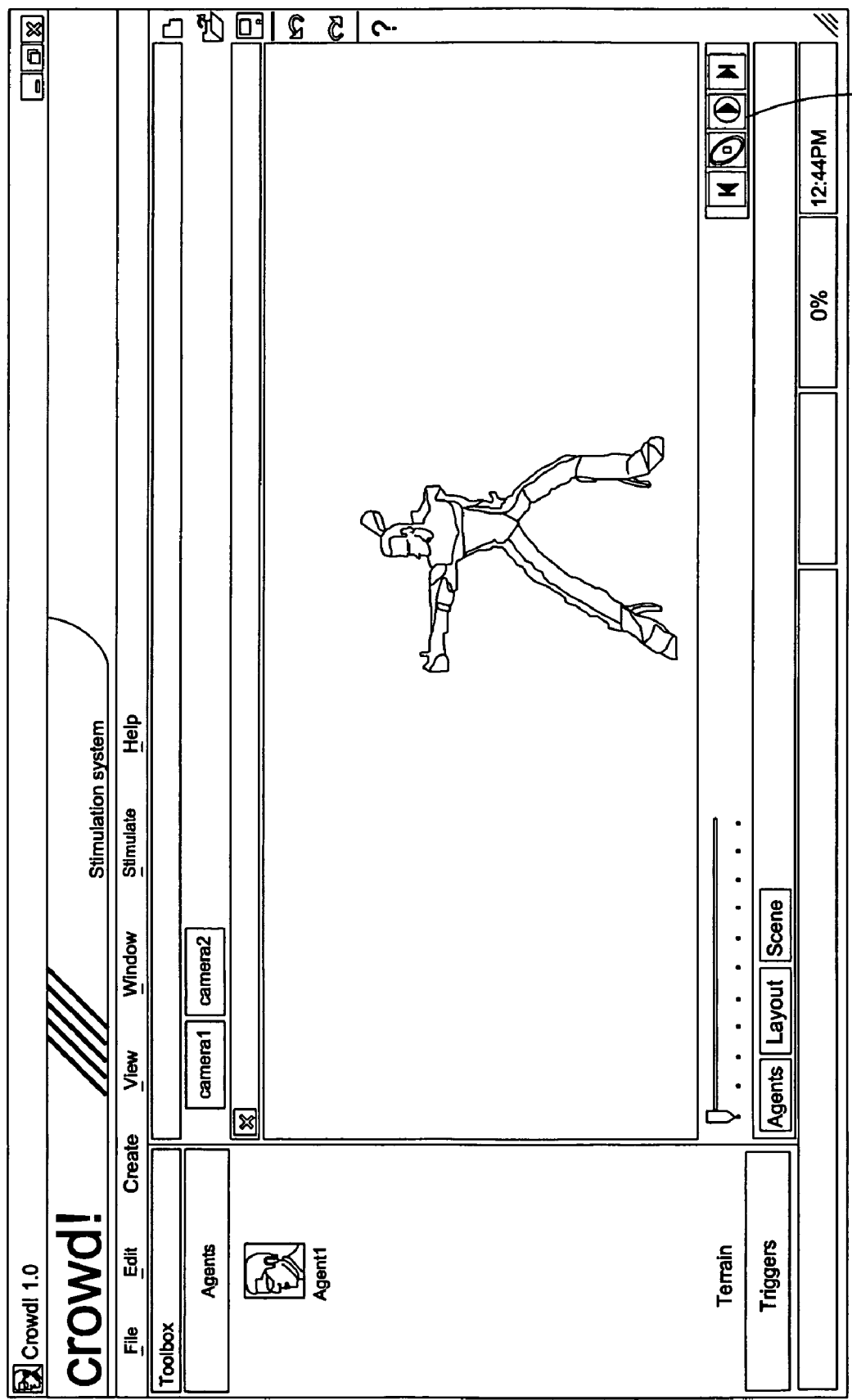
FIG. 18 shows an composite animation retrieved from a previous session.
Figure 19:
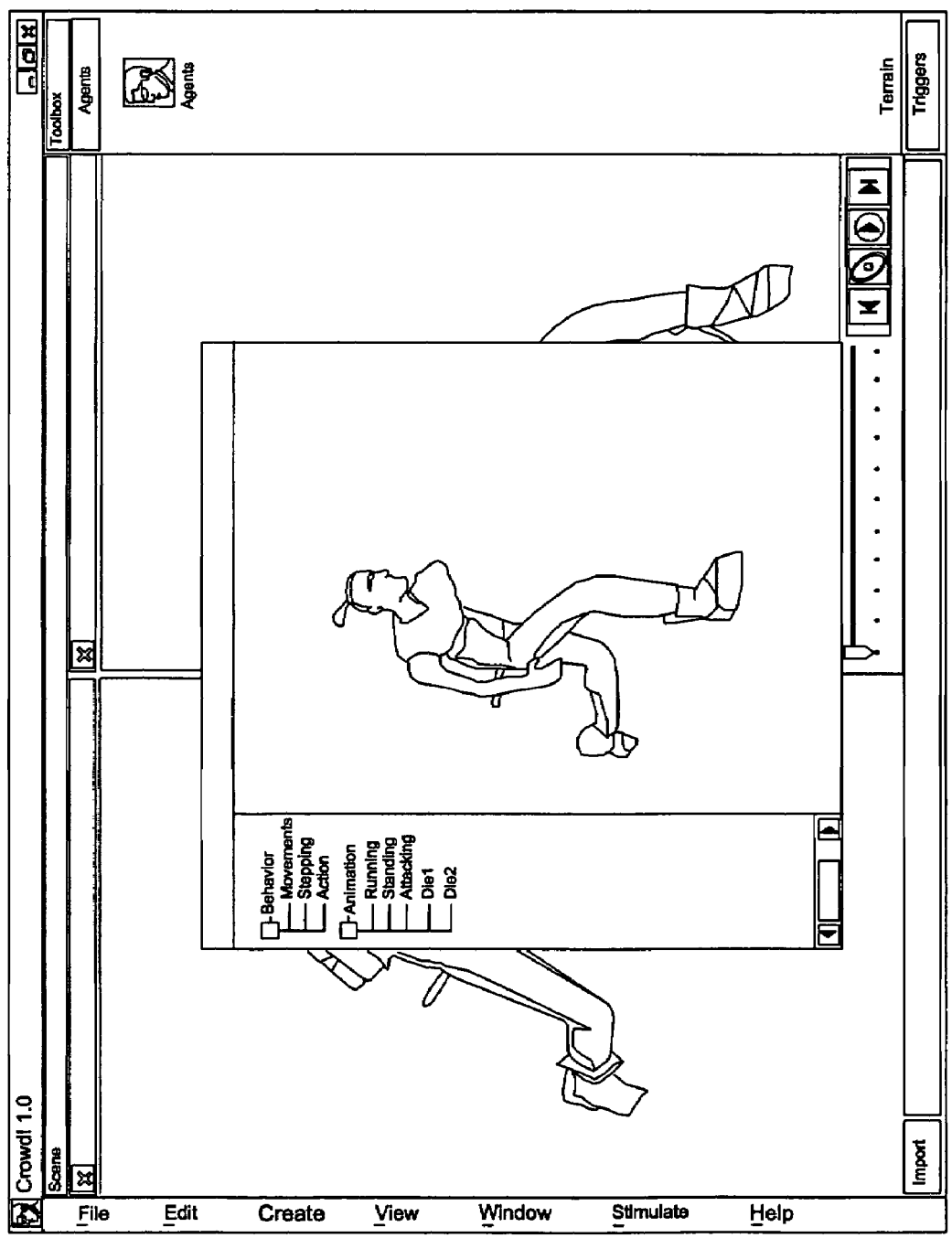
FIG. 19 shows several user interface panels overlapping each other.

FIG. 18 shows a composite animation retrieved from a previous session. As shown in FIG. 18, a retrieved animation can be replayed by utilizing the user interface controls (1810) such as Play, Stop, and Pause. To be consistent with the widely adopted and familiar Windows User Interface Guideline, and allow maximum flexibility for the animation artist, each of the user interface windows or panels can be made floating and overlapped or overlaid on each other. FIG. 19 shows several user interface panels overlapping each other.

In yet another aspect of the invention, the present invention provides intelligent animation behavior of virtual or digital performers by enabling communication between the performers. Essentially, the communication behavior is simulated by providing communication mechanism between the animation state machines such that communication events can trigger state transitions. In other words, communication events can be state transition events or conditions. Utilizing the communication capability, the present invention can provide intelligent animation behaviors by specifying relationships between the performers, defining commands based on the relationships between the performers, defining intelligent animation behavior of one or more groups of the performers by utilizing one or more of the defined commands, and producing the intelligent animation behavior by executing the one or more of the defined commands. That is, the present invention provides capability to allow digital performers to react in clusters or teams, and to form complex strategies based on the ranking structure defined within a team. For example, a Colonel Performer may order a Platoon Leader Performer to move to a specific location, and the Platoon Leader, in turn, may order the Soldier Performers to move to that location.

Once importation and definition have been completed, the user executes simulation from the client computer. The client computer compiles Actions and State Machines, and sends Starting Transforms for each Performers to the server. The server, also called NeuroMachine, moves Performers based on current Transform, State, and Actions. Then, NeuroMachine returns back the list of Performers, States, and Transforms to the client computer. The client computer does a detailed check for local non-animated actors and obstacles, and applies detailed physics changes. Finally, the client computer draws each Performer in the list giving the current state and moves based on Transform. The resulting animations or simulations can be displayed in real-time or be cached to disk as a set of frames to be loaded in another package or finishing. As discussed above, rendering and display of resulting animation can also be performed at a separate, dedicated graphics hardware, without departing from the scope of the present invention.

In yet another aspect of the invention, the present invention is computer-executable process steps for intelligent scalable computer animation, wherein the process steps are stored on a computer-readable medium, where the steps include a step for subdividing animation tasks for a crowd simulation frame into world transformation animation tasks and local transformation animation tasks, a step for subdividing the world transformation animation tasks into one or more performer animation task partitions, a step for distributing the one or more performer animation task partitions among one or more scalable animation servers, a step for executing performer animation tasks in the one or more performer animation task partitions on the one or more scalable animation servers, a step for executing the local transformation animation tasks on the animation client, and a step for displaying resulting crowd simulation on a display device. The computer-executable process steps of the present invention can be stored on any computer-readable medium known to those skilled in the art, including a hard disk, a compact disc (CD), and any computer memory device, without departing from the scope of the present invention.

The computer-executable process steps of the present invention can be deployed as an integral part of the scalable intelligent animation system according to the present invention. They can also be packaged as a separate software product to be installed on appropriate computer systems. The computer-executable process steps of the present invention can also be provided as a library, runtime loadable modules, or middleware, without departing from the scope of the present invention.

Figure 20:
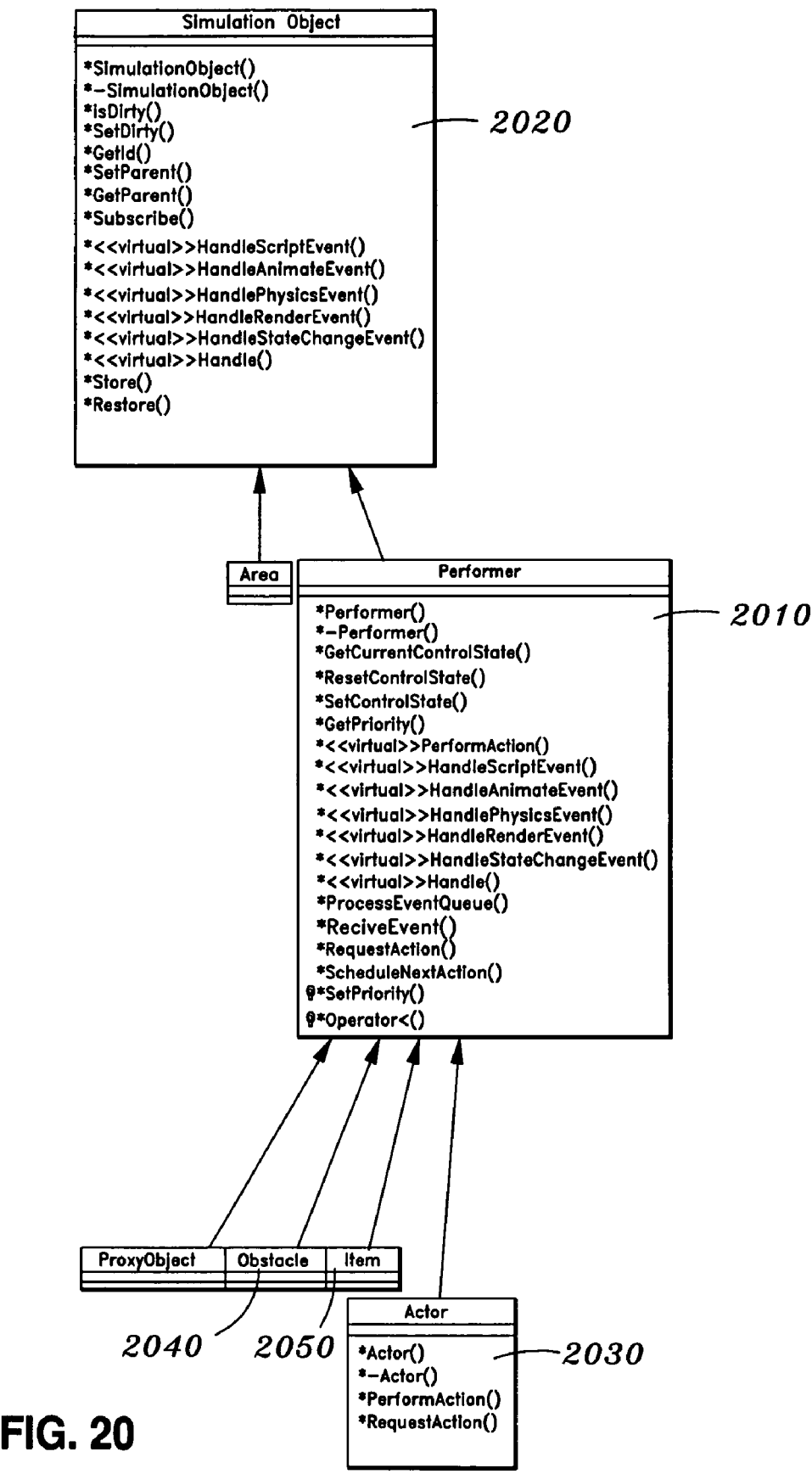
FIG. 20 shows UML class diagrams for Performer class and SimulationObject class.
Figure 21:
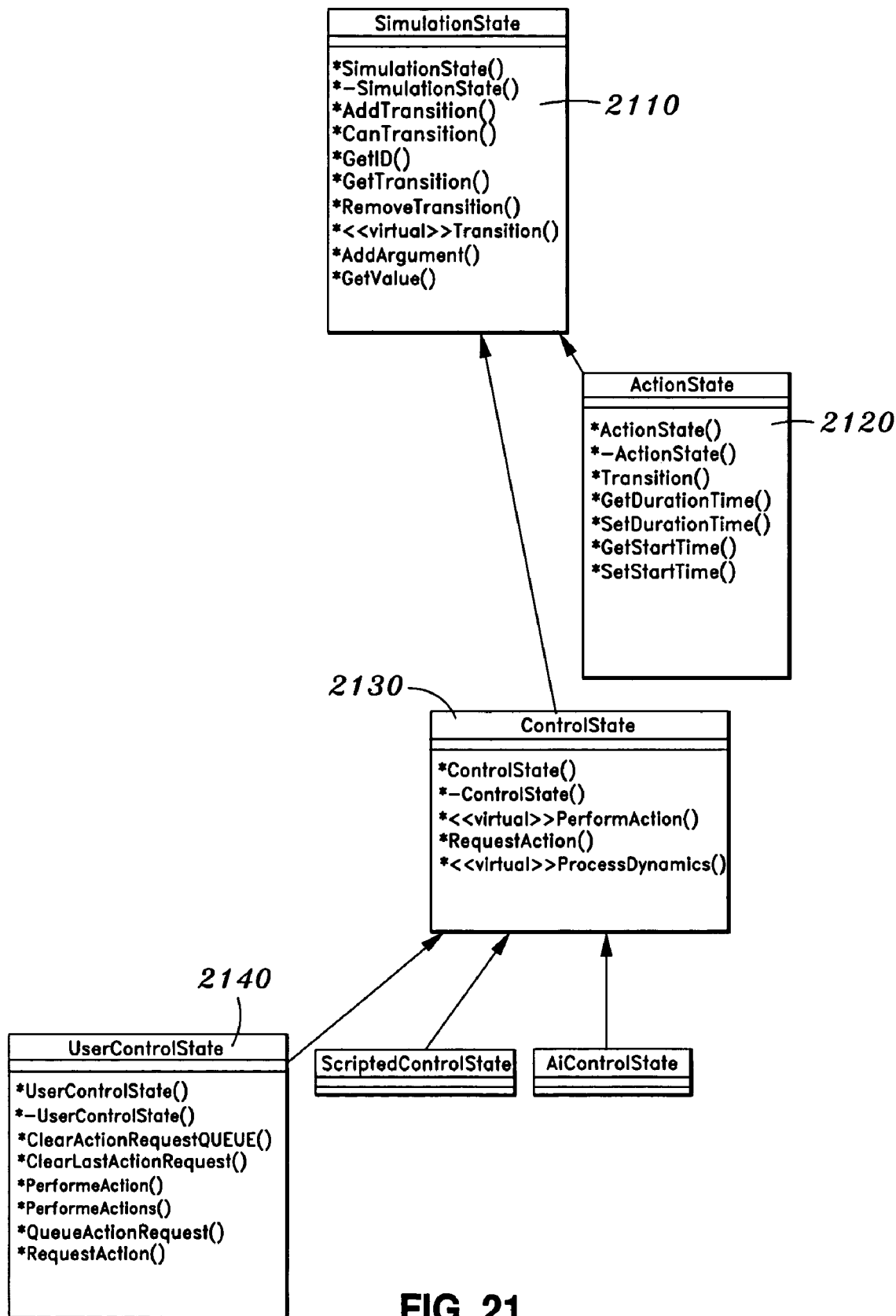
FIG. 21 shows UML class diagrams for SimulationState class, ActionState class, and ControlState class.
Figure 22:
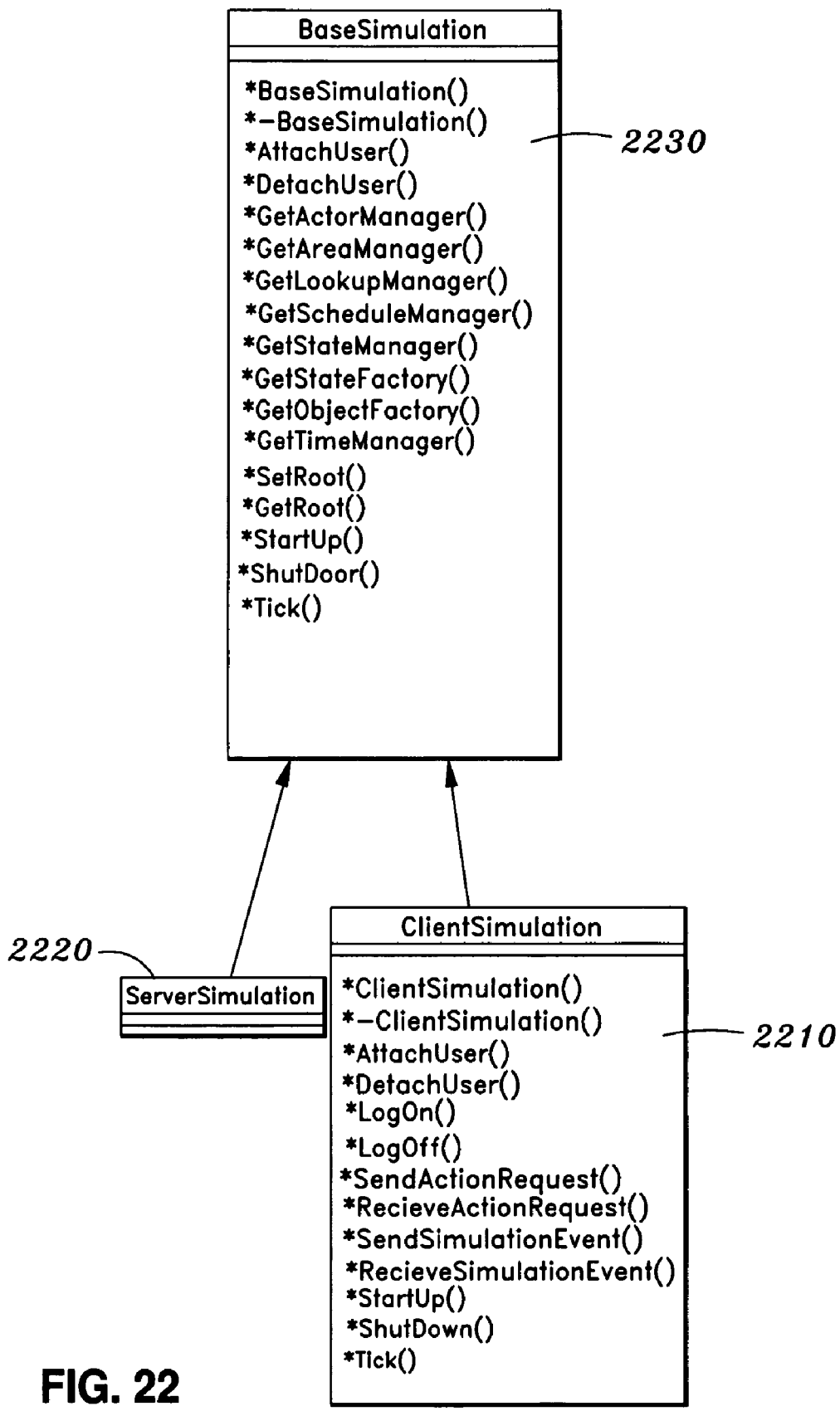
FIG. 22 shows UML class diagrams for ClientSimulation class, ServerSimulation class, and BaseSimulation class.

FIG. 20, FIG. 21, FIG. 22, and FIG. 23 illustrate an implementation of the computer-executable process steps of the present invention. FIG. 20 shows UML class diagrams for Performer class (2010), which is a derived class of SimulationObject class (2020). The present invention utilizes object oriented technology, and a preferred embodiment of the present invention is implemented in C++ computer language. As shown in FIG. 20, SimulationObject class (2020) is a base class for Performer class (2010) which in turn serves as the base class for Actor (2030), Obstacle (2040), and Item (2050) classes. Similarly, FIG. 21 shows SimulationState class (2110) as a base class for ActionState class (2120) and ControlState class (2130). As shown in FIG. 21, ControlState class (2130) is in turn a base class for UserControlState class (2140). FIG. 22 shows ClientSimulation class (2210) and ServerSimulation class (2220) derived from the base class of BaseSimulation class (2230).

Figure 23:
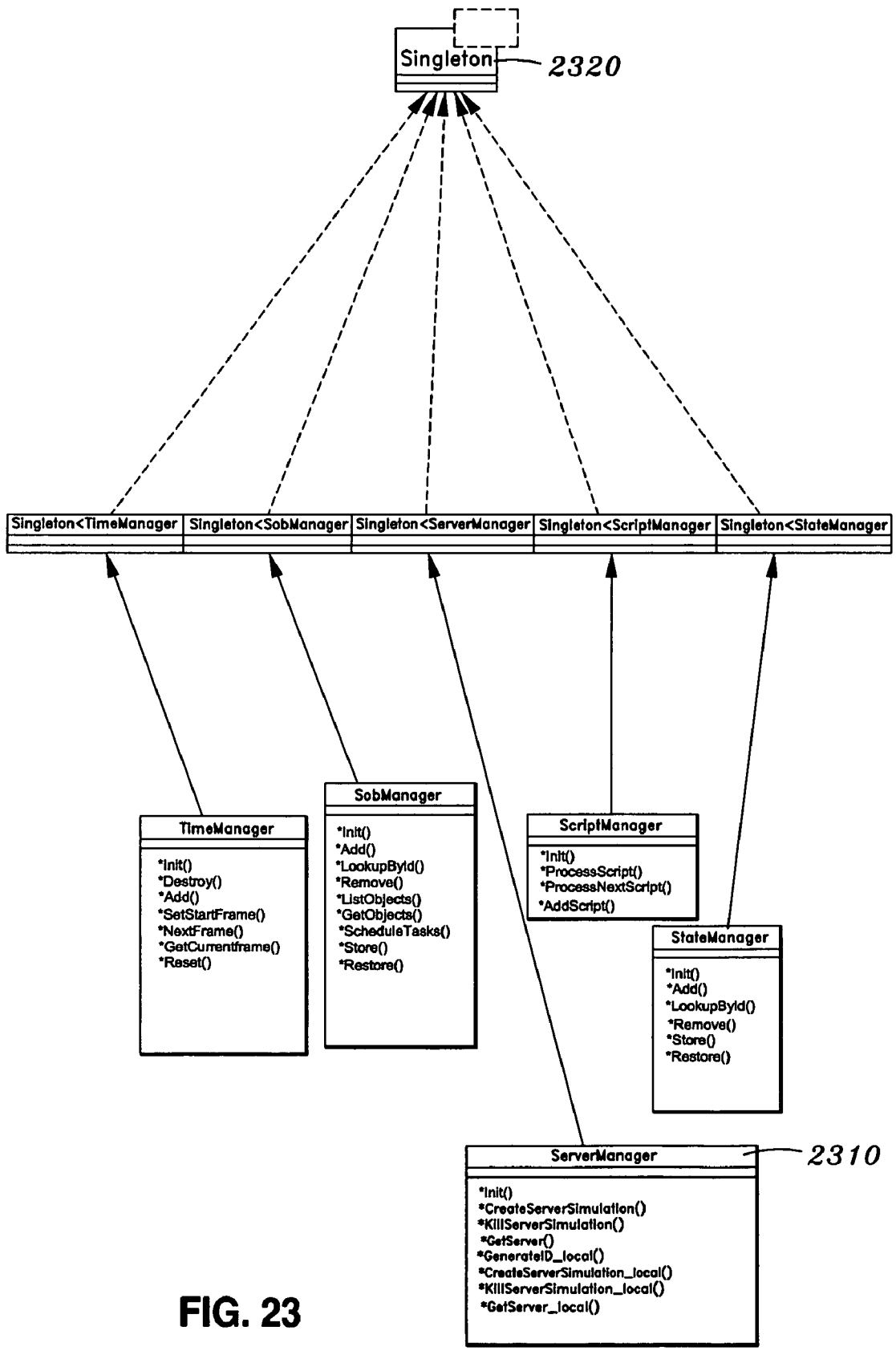
FIG. 23 shows UML class diagrams for Singleton template base class and ServerManager class.

The present invention also utilizes patterns technology well known to those skilled in the art of object oriented software design. As shown in FIG. 23, Singleton pattern is employed for many classes that allow only one instance of the class object. For example, ServerManager class (2310) is a subclass of a Singleton template base class (2320).

Figure 24:
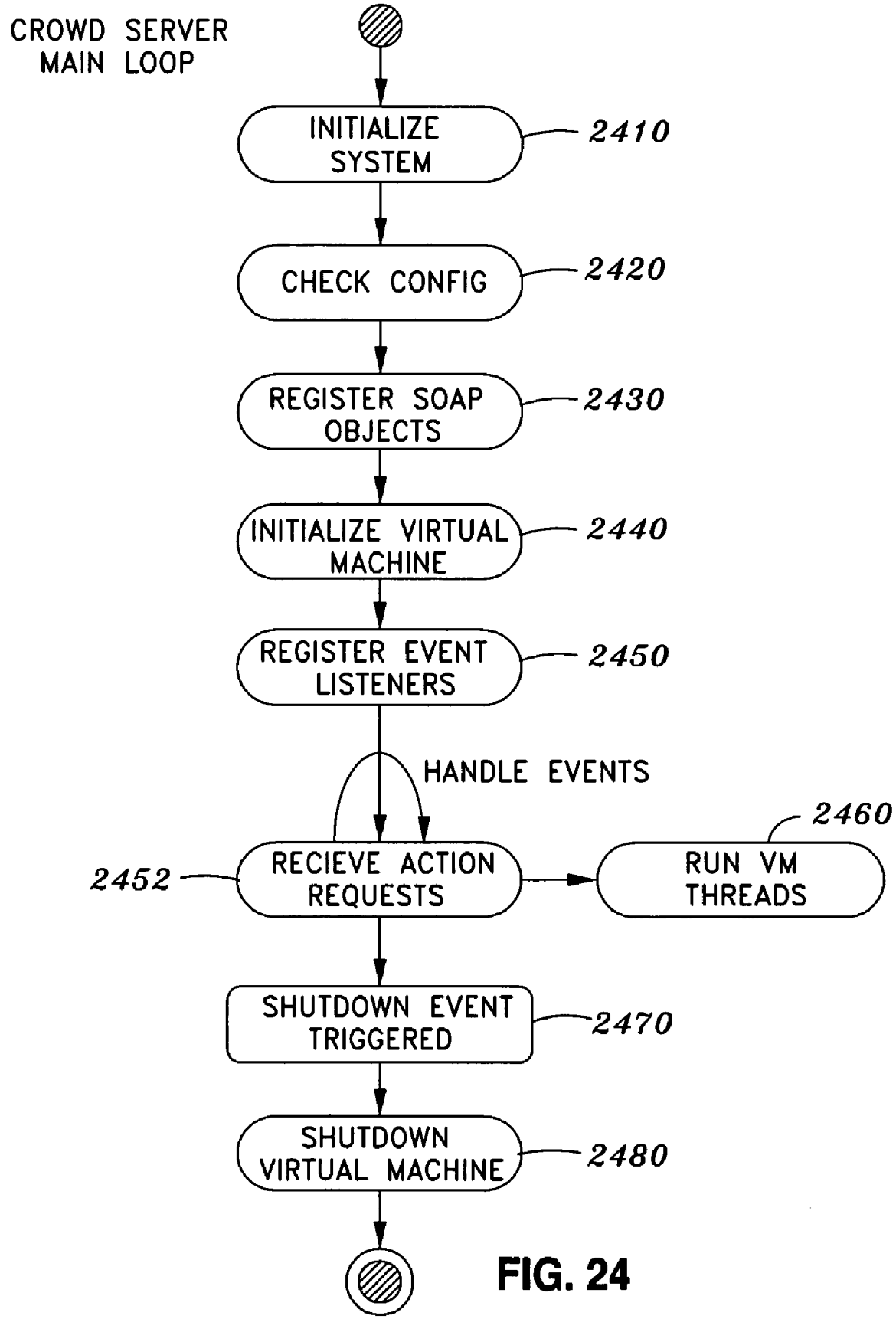
FIG. 24 illustrates an operation of a server according to the present invention.

FIG. 24 illustrates an operation of a server according to the present invention. Shown in FIG. 24 is the main loop for a server according to the present invention. In a preferred embodiment, the scalable server of the present invention implements a simulation or animation task as a virtual machine. As shown in FIG. 24, the server of the present invention starts with system initialization (2410) followed by checking system configuration (2420), registering communication objects (SOAP objects) (2430), initializing simulation virtual machine (2440), and registering Events to listen for (2450). Then, the server waits for events, and, when an event is received, handles the event by running a virtual machine thread (2460) that executes the event handler function. This process continues until a Shutdown event is received (2470), upon which the virtual machine is shutdown (2480) and the server exits the execution loop, terminating the server operation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for intelligent parallel processing for scalable computer animation, comprising:
   receiving at a controlling animation server an animation frame from an animation client;
   distributing, from the controlling animation server, animation tasks for the received animation frame among one or more scalable animation servers, including the controlling animation server, by: (1) spatially partitioning animation tasks for the animation frame into animation volumes based on number of performers contained in a spatial volume and number of the one or more scalable animation servers such that the animation volumes are at least as numerous as the one or more scalable animation servers, (2) assigning the animation volumes to the one or more scalable animation servers, (3) if performers in animation volumes assigned to a scalable animation server are more numerous than maximum for the scalable animation server, reassigning excess performer animation tasks among one or more animation servers, (4) assigning weights to the animation volumes based on likelihood of performers to move across volume boundaries, (5) grouping the animation volumes together based on cumulative weights assigned, (6) re-calculating the weights utilizing statistical parameters from previous animation frames, and (7) distributing the animation volumes among the one or more scalable animation servers, wherein the animation volumes with higher weights are sent to animation servers with higher priorities;
   executing at the one or more scalable animation servers animation tasks contained in the animation volumes received from the controlling animation server;
   returning animation results to the animation client; and
   outputting resulting animation or simulations to one or more of: a display system, memory of the one or more scalable animation servers, and memory of the animation client.

2. The method of claim 1, wherein partitioning animation tasks is accomplished utilizing tree data structures and tree balancing algorithms.

3. The method of claim 1, wherein weights for an animation volume include weights assigned to performers in the animation volume based on proximity of performers to volume boundaries and tagged areas of interest.

4. A computer-readable medium storing computer-executable process instructions for intelligent scalable computer animation, the instructions comprising code for:
   receiving at a controlling animation server an animation frame from an animation client;
   distributing, from the controlling animation server, animation tasks for the received animation frame among one or more scalable animation servers, including the controlling animation server, by: (1) spatially partitioning animation tasks for the animation frame into animation volumes based on number of performers contained in a spatial volume and number of the one or more scalable animation servers such that the animation volumes are at least as numerous as the one or more scalable animation servers, (2) assigning the animation volumes to the one or more scalable animation servers, (3) if performers in animation volumes assigned to a scalable animation server are more numerous than maximum for the scalable animation server, reassigning excess performer animation tasks among one or more animation servers, (4) assigning weights to the animation volumes based on likelihood of performers to move across volume boundaries, (5) grouping the animation volumes together based on cumulative weights assigned, (6) re-calculating the weights utilizing statistical parameters from previous animation frames, and (7) distributing the animation volumes among the one or more scalable animation servers, wherein the animation volumes with higher weights are sent to animation servers with higher priorities;
   executing at the one or more scalable animation servers animation tasks contained in the animation volumes received from the controlling animation server; and
   returning animation results to the animation client.

* * * * *